United States Patent
Sufleta et al.

(10) Patent No.: US 10,659,392 B2
(45) Date of Patent: *May 19, 2020

(54) REDUNDANT INLINE-BYPASS SWITCH

(71) Applicant: Gigamon Inc., Santa Clara, CA (US)

(72) Inventors: Zbigniew Sufleta, Cobb, CA (US); Hung Nguyen, San Jose, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,485

(22) Filed: Nov. 28, 2018

(65) Prior Publication Data

US 2019/0097947 A1    Mar. 28, 2019

Related U.S. Application Data

(63) Continuation of application No. 15/620,604, filed on Jun. 12, 2017, now Pat. No. 10,178,049, which is a (Continued)

(51) Int. Cl.
  *H04L 12/947* (2013.01)
(52) U.S. Cl.
  CPC .................. *H04L 49/25* (2013.01)
(58) Field of Classification Search
  CPC ......... H04L 12/24; H04L 12/54; H04L 12/56; H04L 12/70; H04L 12/437; H04L 12/701; H04L 12/707; H04L 12/741; H04L 12/743; H04L 12/745; H04L 12/749; H04L 12/947; H04L 12/4625; H04L 45/24; H04L 49/10; H04L 49/20; H04L 49/25; H04L 49/253; H04L 49/355; H04L 63/02; H04L 63/1416; H04L 2012/6443; H04L 12/74; H04L 12/931; H04L 12/933; H04L 12/935;
  (Continued)

(56) References Cited

U.S. PATENT DOCUMENTS

| 5,317,198 A | * 5/1994 | Husbands | ............. | H04L 12/423 |
| | | | | 250/227.11 |
| 6,038,618 A | 3/2000 | Beer et al. | | |

(Continued)

FOREIGN PATENT DOCUMENTS

EP    3361488 A1 *  8/2018  ............. H02H 9/041

OTHER PUBLICATIONS

Non Final Office Action dated Jun. 13, 2018 for U.S. Appl. No. 15/620,604, filed Jun. 12, 2017, 25 pages.
(Continued)

*Primary Examiner* — Tri H Phan
(74) *Attorney, Agent, or Firm* — Perkins Coie LLP

(57) ABSTRACT

An inline-bypass switch system includes: a first inline-bypass switch appliance having a first bypass component, a first switch coupled to the first bypass component, and a first controller; and a second inline-bypass switch appliance having a second bypass component, a second switch coupled to the second bypass component, and a second controller; wherein the first controller in the first inline-bypass switch appliance is configured to provide a state signal that is associated with a state of the first inline-bypass switch appliance; and wherein the second controller in the second inline-bypass switch appliance is configured to control the second bypass component based at least in part on the state signal.

18 Claims, 15 Drawing Sheets

Related U.S. Application Data continuation of application No. 14/693,809, filed on Apr. 22, 2015, now Pat. No. 9,680,771.

(58) Field of Classification Search
CPC . H04L 12/937; H04L 12/939; H04L 43/0817; H04L 49/00
See application file for complete search history.

(56) References Cited

U.S. PATENT DOCUMENTS

| | | | |
|---|---|---|---|
| 6,791,947 B2 * | 9/2004 | Oskouy | H04L 12/56 370/238 |
| 7,209,448 B2 * | 4/2007 | Oskouy | H04L 12/56 370/238 |
| 7,295,776 B2 | 11/2007 | Okubo et al. | |
| 7,551,851 B2 | 6/2009 | Zirnheld et al. | |
| 7,894,336 B2 | 2/2011 | Monse et al. | |
| 8,386,846 B2 | 2/2013 | Cheung | |
| 8,830,819 B2 * | 9/2014 | Leong | H04L 49/10 370/217 |
| 9,521,615 B2 | 12/2016 | Westberg et al. | |
| 9,680,771 B2 * | 6/2017 | Sufleta | H04L 49/25 |
| 9,722,955 B2 | 8/2017 | Nguyen et al. | |
| 9,843,460 B2 | 12/2017 | Sufleta et al. | |
| 9,860,616 B1 | 1/2018 | Amarittapark | |
| 9,888,095 B2 * | 2/2018 | Caulfield | H04L 12/4633 |
| 9,960,953 B2 | 5/2018 | Sufleta | |
| 10,009,263 B1 | 6/2018 | Sufleta et al. | |
| 10,142,210 B2 * | 11/2018 | Sufleta | H04L 43/106 |
| 10,178,049 B2 * | 1/2019 | Sufleta | H04L 49/25 |
| 2009/0217290 A1 | 8/2009 | Nayberg | |
| 2009/0262745 A1 | 10/2009 | Leong et al. | |
| 2011/0211443 A1 | 9/2011 | Leong et al. | |
| 2012/0023340 A1 | 1/2012 | Cheung | |
| 2014/0241718 A1 | 8/2014 | Jiang | |
| 2016/0315477 A1 | 10/2016 | Nguyen et al. | |
| 2017/0026287 A1 | 1/2017 | Vinsel et al. | |
| 2017/0026289 A1 | 1/2017 | Vinsel et al. | |
| 2017/0034078 A1 | 2/2017 | Nguyen et al. | |
| 2017/0214566 A1 | 7/2017 | Sufleta | |
| 2018/0091432 A1 | 3/2018 | Ma et al. | |
| 2018/0123831 A1 | 5/2018 | Sufleta et al. | |

OTHER PUBLICATIONS

Notice of Allowance dated Oct. 12, 2018; for U.S. Appl. No. 15/620,604; Z. Sufleta et al. filed Jun. 12, 2017, 11 pages., dated Oct. 12, 2018, 11.

Sufleta, Zbigniew , et al., Notice of Allowance dated Sep. 10, 2018 for U.S. Appl. No. 15/815,225 of Z. Sufleta et al., filed Nov. 16, 2017;, dated Sep. 10, 2018.

* cited by examiner

REDUNDANT INLINE-BYPASS SWITCH

CROSS-REFERENCE TO RELATED APPLICATIONS

This application is a continuation of U.S. patent application Ser. No. 15/620,604, filed Jun. 12, 2017, issued as U.S. Pat. No. 10,178,049, which is a continuation of U.S. patent application Ser. No. 14/693,809, filed Apr. 22, 2015, issued as U.S. Pat. No. 9,680,771, which are incorporated by reference herein in their entirety.

FIELD

This application relates generally to network devices, and more specifically, to inline-bypass switch appliances.

BACKGROUND

A switch appliance connected between two communicating network nodes may include a switch for forwarding packets to an inline tool. The switch appliance may also include a bypass component to bypass the switch in certain situation. For example, if the switch appliance lost power, then the switch may not be able to forward packets to the inline tool. In such situation, the bypass component may provide a physical bridge to transmit the packets from a transmitting node to a receiving node, without passing the packets to the switch for forwarding to the inline tool. However, in such solution, the packets would not be able to be processed by the inline tool.

SUMMARY

An inline-bypass switch system includes: a first inline-bypass switch appliance having a first bypass component, a first switch coupled to the first bypass component, and a first controller; and a second inline-bypass switch appliance having a second bypass component, a second switch coupled to the second bypass component, and a second controller; wherein the first controller in the first inline-bypass switch appliance is configured to provide a state signal that is associated with a state of the first inline-bypass switch appliance; and wherein the second controller in the second inline-bypass switch appliance is configured to control the second bypass component based at least in part on the state signal.

Optionally, the first switch is configurable to perform packet forwarding to a first set of one or more inline tools, and the second switch is configurable to perform packet forwarding to a second set of one or more inline tools.

Optionally, the first bypass component and the second bypass component are operable to place the inline-bypass switch system in one of at least three states, the three states comprising: a primary forwarding state in which the first inline-bypass switch appliance is configured to perform packet forwarding to the first set of the one or more inline tools; a secondary forwarding state in which the second inline-bypass switch appliance is configured to perform packet forwarding to the second set of the one or more inline tools; and a physical bypass state in which the first inline-bypass switch appliance does not perform packet forwarding to the first set of the one or more inline tools, and the second inline-bypass switch appliance does not perform packet forwarding to the second set of the one or more inline tools.

Optionally, the first controller is configured to provide the state signal having a first value when the first bypass component in the first inline-bypass switch appliance is in a relays-open state; and wherein the second controller is configured to place the second bypass component in the second inline-bypass switch appliance in a relays-closed state when the state signal has the first value.

Optionally, the first controller is configured to provide the state signal having a second value that is different from the first value when the first bypass component in the first inline-bypass switch appliance is in a relays-closed state; and wherein the second controller is configured to place the second bypass component in the second inline-bypass switch appliance in a relays-open state when the state signal has the second value and when a packet forwarding path through the second switch has been established.

Optionally, the first inline-bypass switch appliance comprises a first communication interface for receiving a packet from a network node, a second communication interface for outputting the packet to the second inline-bypass switch appliance, and a third communication interface for outputting the state signal for reception by the second inline-bypass switch appliance.

Optionally, the second inline-bypass switch appliance comprises a first communication interface for receiving a packet from the first inline-bypass switch appliance, a second communication interface for outputting the packet to a network node, and a third communication interface for receiving the state signal from the first inline-bypass switch appliance.

Optionally, the first bypass component has multiple relays; wherein when the relays are closed, the first bypass component is in a relays-closed state, and when the relays are opened, the first bypass component is in a relays-open state.

Optionally, the first controller is configured to place the first bypass component in the relays-open state when a packet forwarding path through the first switch has been established.

Optionally, the state signal has a value that represents the first bypass component being in the relays-open state.

Optionally, the first controller is configured to place the first bypass component in the relays-closed state when a packet forwarding path through the first switch has not been established.

Optionally, the state signal has a value that represents the first bypass component being in the relays-closed state.

A first inline-bypass switch appliance includes: a first bypass component; a first switch coupled to the first bypass component, the first switch configured to communicate with one or more inline tools; a first controller configured to provide a state signal that is associated with a state of the first bypass component; a first communication interface configured to receive a packet from a first network node; a second communication interface configured to output the packet to a second inline-bypass switch appliance; and a third communication interface configured to output the state signal for reception by the second inline-bypass switch appliance.

Optionally, the first bypass component is operable to be in a relays-closed state, and is operable to be in a relays-open state; wherein when the first bypass component is in the relays-closed state, the first bypass component is configured to pass the packet from the first communication interface to the second communication interface without passing the packet to the first switch; and wherein when the first bypass component is in the relays-open state, the first bypass component is configured to pass the packet from the first communication interface to the first switch.

Optionally, the first bypass component comprises one or more relays.

Optionally, the first controller is configured to close the one or more relays in the first bypass component when a packet forwarding path through the first switch has not been established or when the first inline-bypass switch appliance is powered down; and wherein the first controller is configured to open the one or more relays in the first bypass component when the packet forwarding path through the first switch has been established.

Optionally, the state signal has a first value when the state of the first bypass component is in the first state, and wherein the state signal has a second value that is different from the first value when the state of the first bypass component is in the second state.

Optionally, the first bypass component has one or more relays that are closed whenever there is a power loss for the first inline-bypass switch appliance.

An inline-bypass switch system includes the first inline-bypass switch appliance, and the second inline-bypass switch appliance.

Optionally, the second inline-bypass switch appliance comprises: a second bypass component; a second switch coupled to the second bypass component; a second controller; a first communication interface configured to receive the packet from the second communication interface of the first inline-bypass switch appliance; a second communication interface configured to output the packet to a second network node; and a third communication interface configured to receive the state signal; wherein the second controller is configured to selectively place the second bypass component in a first state or a second state.

Optionally, the first state of the second bypass component comprises a relays-closed state, and the second state of the second bypass component comprises a relays-open state; wherein when the second bypass component is in the relays-closed state, the second bypass component is configured to pass the packet from the first communication interface of the second inline-bypass switch appliance to the second communication interface of the second inline-bypass switch appliance without passing the packet to the second switch; and wherein when the second bypass component is in the relays-open state, the second bypass component is configured to pass the packet from the first communication interface of the second inline-bypass switch appliance to the second switch.

Optionally, the second bypass component comprises one or more relays.

Optionally, the second controller is configured to close the one or more relays in the second bypass component when one or more relays in the first bypass component are open; wherein the second controller is configured to open the one or more relays in the second bypass component when the one or more relays in the first bypass component are closed, and when a packet forwarding path through the second switch has been established; and wherein the second controller is configured to close the one or more relays in the second bypass component when the one or more relays in the first bypass component are closed, and when the packet forwarding path through the second switch has not been established.

Optionally, the second controller of the second inline-bypass switch appliance is configured to control the second bypass component based at least in part on the state signal received from the first inline-bypass switch appliance.

An inline-bypass switch appliance includes: a bypass component; a switch configured to communicate with one or more inline tools; a controller; a first communication interface configured to receive a packet from another inline-bypass switch appliance; a second communication interface configured to output the packet to a network node; and a third communication interface configured to receive a state signal from the other inline-bypass switch appliance, the state signal being associated with a state of another bypass component in the other inline-bypass switch appliance; wherein the controller is configured to control the bypass component based at least in part on the state signal.

Optionally, the bypass component is operable to be in a relays-closed state, and is operable to be in a relays-open state; wherein when the bypass component is in the relays-closed state, the bypass component is configured to pass the packet from the first communication interface to the second communication interface without passing the packet to the switch; and wherein when the bypass component is in the relays-open state, the bypass component is configured to pass the packet from the first communication interface to the switch.

Optionally, the bypass component comprises one or more relays.

Optionally, the controller is configured to close the one or more relays in the bypass component when one or more relays in the other bypass component are open; wherein the controller is configured to open the one or more relays in the bypass component when the one or more relays in the other bypass component are closed, and when a packet forwarding path through the switch has been established; and wherein the controller is configured to close the one or more relays in the bypass component when the one or more relays in the other bypass component are closed, and when the packet forwarding path through the switch has not been established.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
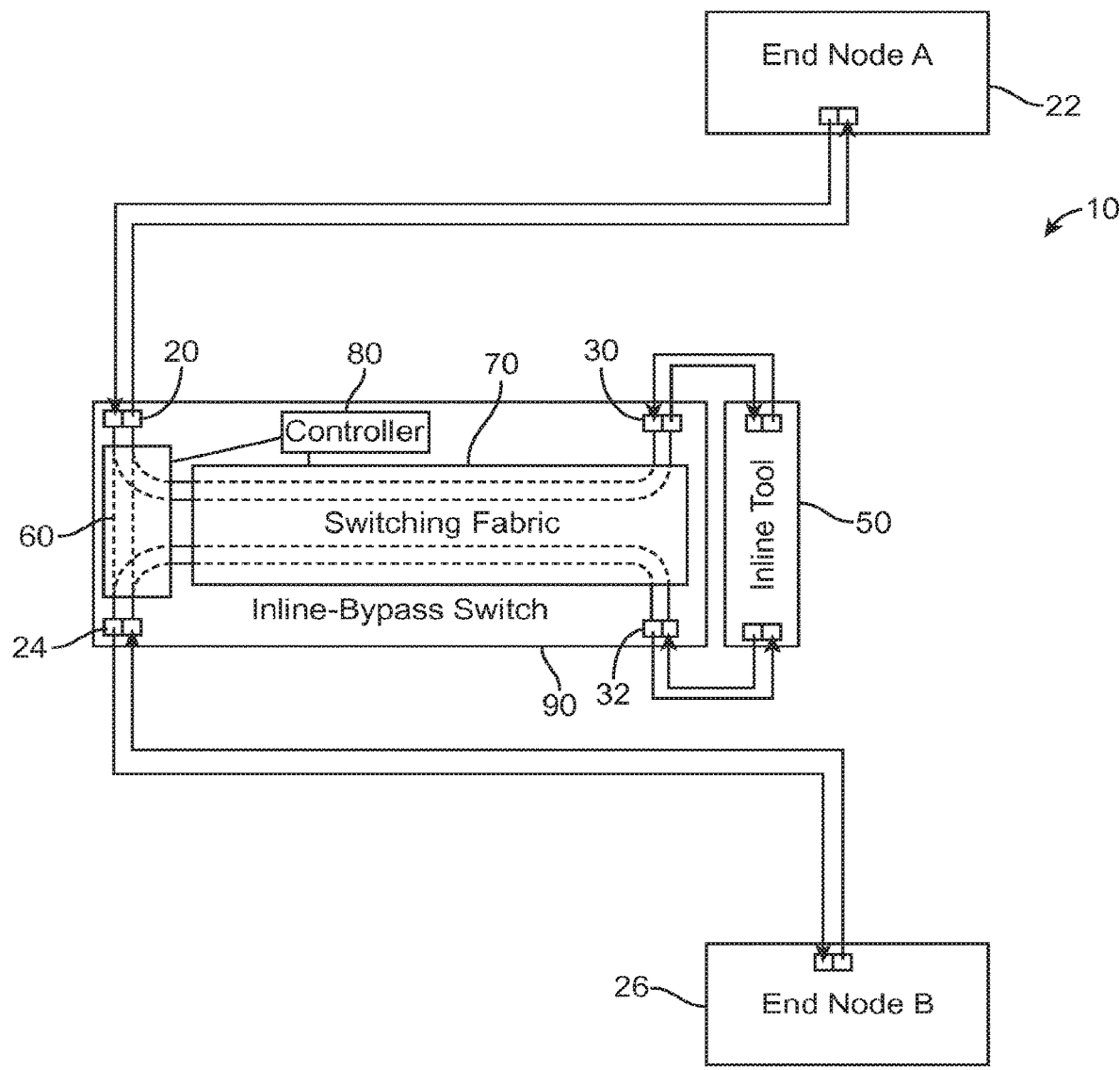
FIG. 1 illustrates an inline-bypass switch appliance.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

FIG. 1 illustrates an inline-bypass switch appliance 10. The inline-bypass switch appliance 10 has a first communication interface 20 for communication with a first node 22, and a second communication interface 24 for communication with a second node 26. The inline-bypass switch appliance 10 also has a third communication interface 30 and a fourth communication interface 32 for communication with an inline tool 50. As shown in the figure, the inline-bypass switch appliance 10 also includes a bypass component 60, a switch 70, and a controller 80. These components are accommodated in a housing 90 so that the inline-bypass switch appliance 10 may be transported, sold, and deployed as a unit.

The bypass component 60 is configured to selectively transmit packets received from the node 22 and/or node 26 to the switch 70, or selectively bypass the switch 70 so that packets received at the first communication interface 20 will be passed directly through the bypass component 60 to the second communication interface 24, or vice versa.

The switch 70 is configured to pass packets to the inline tool 50 via the third communication interface 30. After the inline tool 50 processes the packets, the inline tool 50 then returns the packets to the inline-bypass switch appliance through the fourth communication interface 32. In the illustrated example, a pair of communication interfaces (i.e., communication interfaces 30, 32) is provided for one inline tool 50. In other examples, the inline-bypass switch appliance 10 may include multiple pairs of communication interfaces for communication with multiple inline tools. The switch 70 is configured to forward the packets to one or more inline tools based on one or more parameters, such as IP source address, IP destination address, etc.

The controller 80 is configured to control the operation of the bypass component 60 and the switch 70.

During use, the network nodes 22, 26 exchange packet traffic between themselves connected through data links to the inline-bypass switch appliance 10, with the inline tool 50 attached to the inline-bypass switch appliance 10 through data links. When the inline-bypass switch appliance 10 is powered up, the controller 80 may control the bypass component 60 so that the bypass component 60 is either in a relays-closed state, or a relays-opened state.

Figure 2:
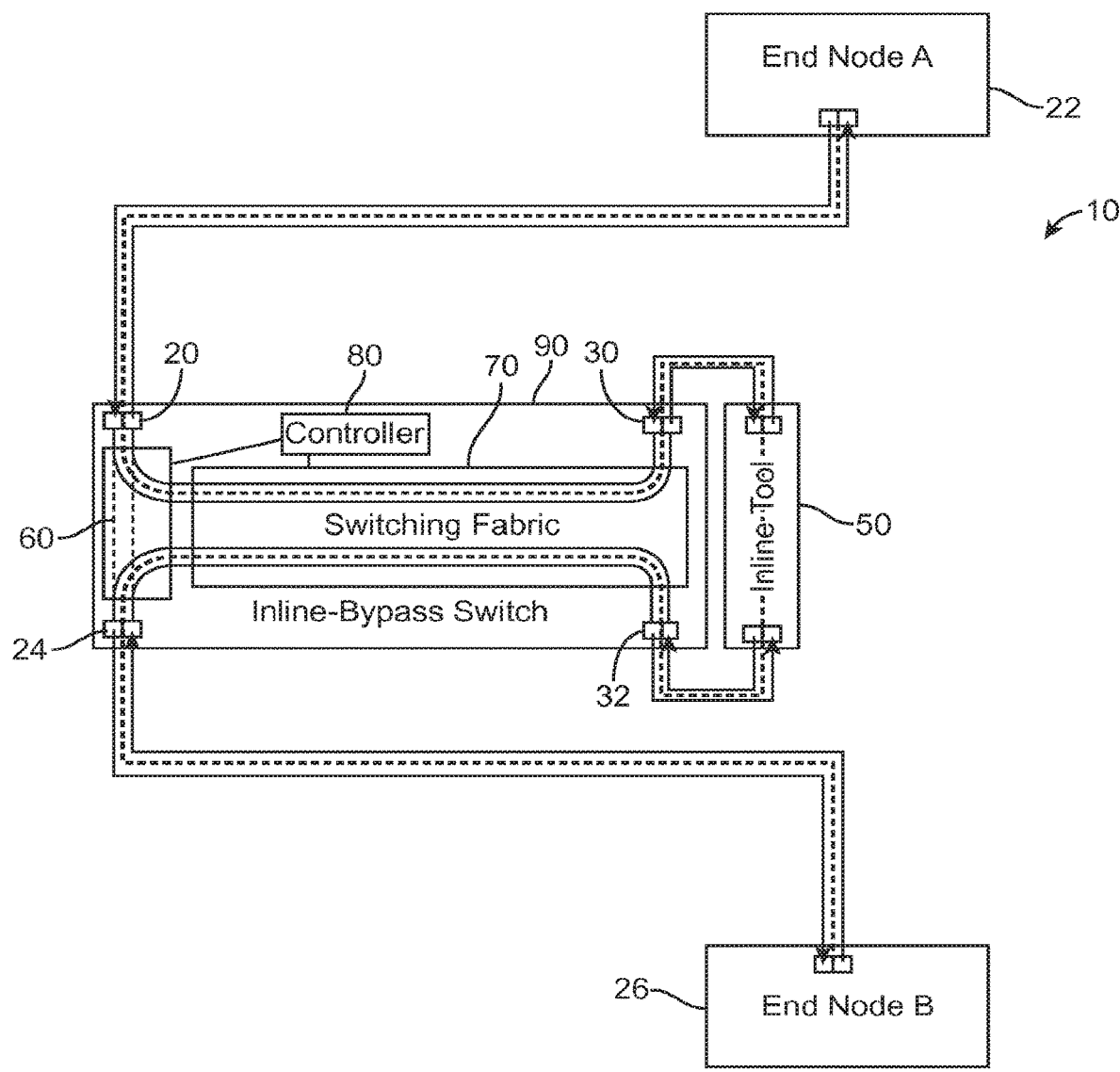
FIG. 2 illustrates the inline-bypass switch appliance of FIG. 1 in a forwarding state.

As shown in FIG. 2, in the relays-opened state, each of the two communication interfaces 20, 24 of the inline-bypass switch appliance 10 connected to the network nodes 22, 26 are coupled with ports on the switch 70, which is configured to forward the traffic arriving at these ports to the communication interfaces 30, 32 linked to the inline tool 50. Thus, when the relays in the bypass component 60 are opened, the inline-bypass switch appliance 10 is accordingly in a forwarding state.

Figure 3:
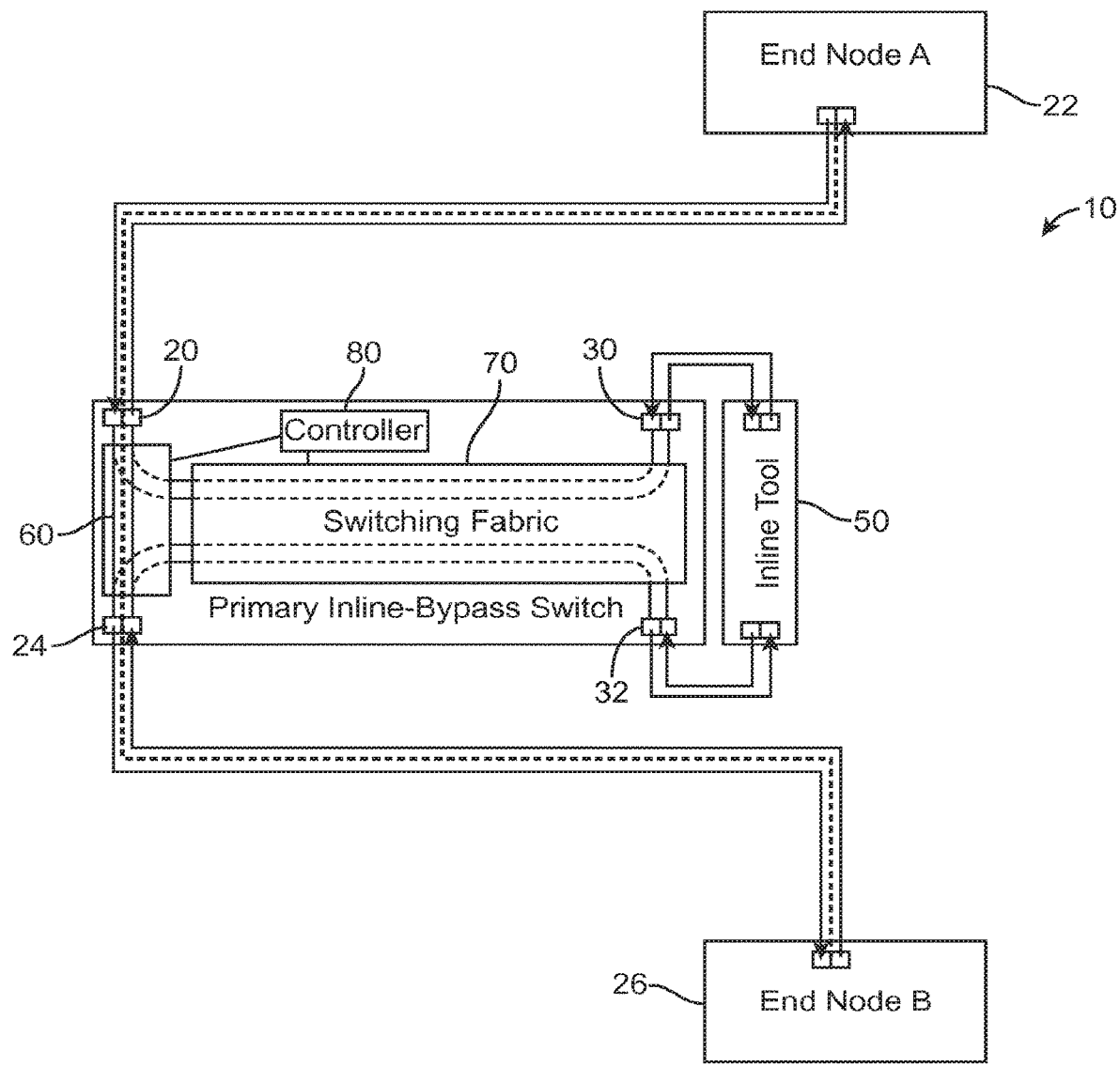
FIG. 3 illustrates the inline-bypass switch appliance of FIG. 1 in a bypass state.

As shown in FIG. 3, in the relays-closed state, the two communication interfaces 20, 24 of the inline-bypass switch appliance 10 connected to the network nodes 22, 26 are physically coupled. As a result, traffic exchanged between the network nodes 22, 26 is directly delivered from one communication interface (e.g., 20/24) to the other communication interface (e.g., 20/24). Thus, when the relays in the bypass component 60 are closed, the inline-bypass switch appliance 10 is accordingly in a bypass state.

When the inline-bypass switch appliance 10 is powered down or loses power unexpectedly, the bypass component 60 automatically enters the relays-closed state.

Figure 4:
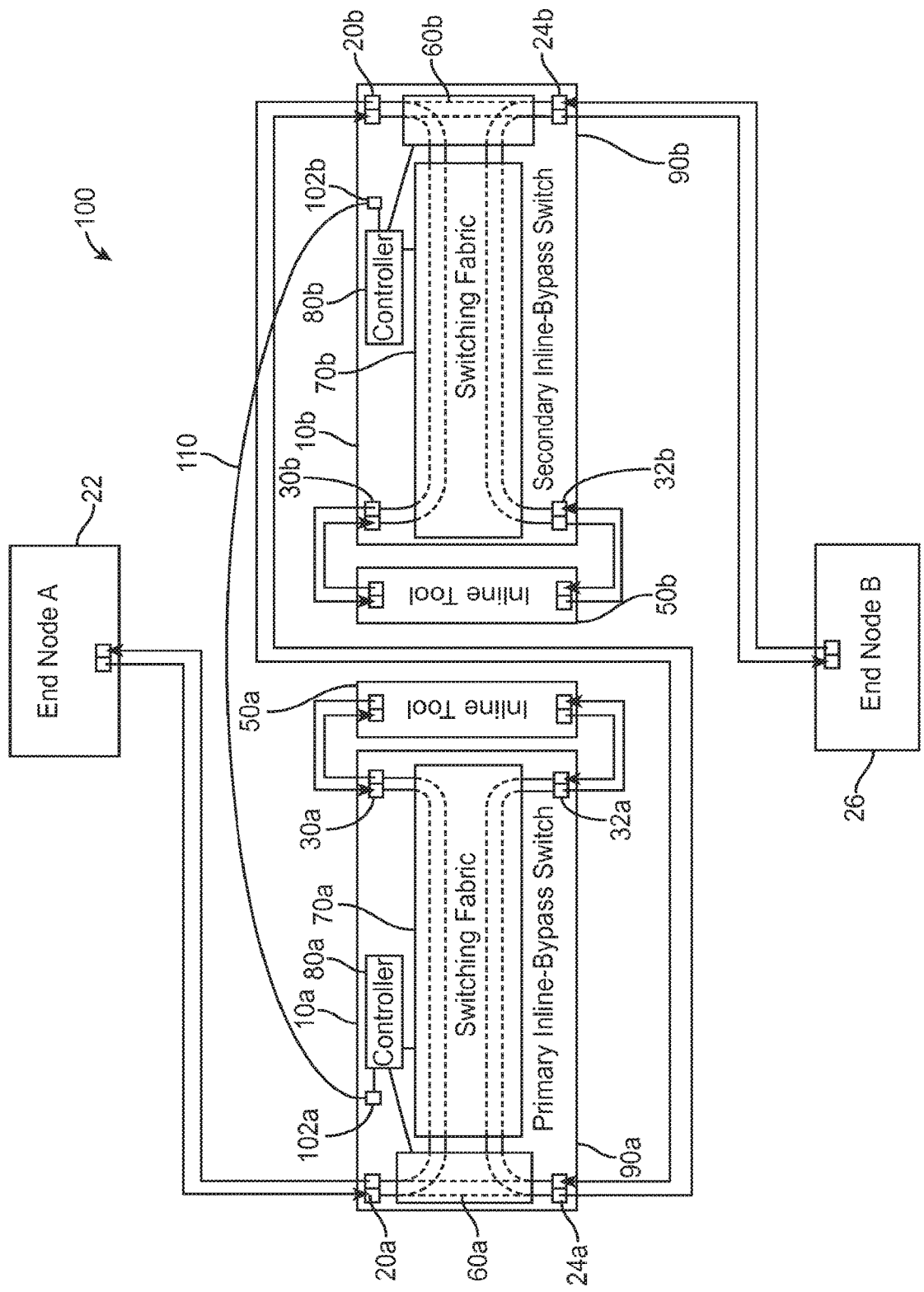
FIG. 4 illustrates an inline-bypass switch system that includes two inline-bypass switch appliances.

FIG. 4 illustrates an inline-bypass switch system 100 that includes two inline-bypass switch appliances, i.e., a first inline-bypass switch appliance 10a and a second inline-bypass switch appliance 10b.

The inline-bypass switch appliance 10a has a first communication interface 20a for communication with a first node 22, and a second communication interface 24a for communication with the second inline-bypass switch appliance 10b. The inline-bypass switch appliance 10a also has a third communication interface 30a and a fourth communication interface 32a for communication with an inline tool 50a. As shown in the figure, the inline-bypass switch appliance 10a also includes a bypass component 60a, a switch 70a, and a controller 80a. These components are accommodated in a housing 90a so that the inline-bypass switch appliance 10a may be transported, sold, and deployed as a unit.

In some cases, the first, second, third, and fourth communication interfaces 20a, 24a, 30a, 32a may be implemented using respective ports. For example, in some cases, the first communication interface 20a may comprise a first network port for communication with the node 22, the second communication interface 24a may comprise an appliance port for communication with the second inline-bypass switch appliance 10b, the third communication interface 30a may comprise a first instrument port for communication with the inline tool 50a, and the fourth communication interface 32a may comprise a second instrument port for communication with the inline tool 50a. Also, in some cases, two or more of the ports may be combined, and be implemented as a single port.

The bypass component 60a is configured to selectively transmit packets received from the node 22 to the switch 70a, or selectively bypass the switch 70a so that packets received at the first communication interface 20a will be passed directly through the bypass component 60a to the second communication interface 24a. In some cases, the bypass component 60a may include physical relays that can be opened or closed in response to one or more control signals. In other cases, the bypass component 60a may include logical relays that are implemented using software.

The switch 70a is configured to pass packets to the inline tool 50a via the third communication interface 30a. After the inline tool 50a processes the packets, the inline tool 50a then returns the packets to the inline-bypass switch appliance 10a through the fourth communication interface 32a. In the illustrated example, a pair of communication interfaces (i.e., communication interfaces 30a, 32a) is provided for one inline tool 50a. In other examples, the inline-bypass switch appliance 10a may include multiple pairs of communication interfaces for communication with multiple inline tools. The switch 70a is configured to forward the packets to one or more inline tools based on one or more parameters, such as IP source address, IP destination address, etc.

In one or more embodiments, the switch 70a may be configured to provide packet transmission in accordance with a pre-determined transmission scheme. In some embodiments, the switch 70a may be user-configurable such that packets may be transmitted in a one-to-one configuration (i.e., from one network port to an instrument port). As used in this specification, the term "instrument port" refers to any port that is configured to transmit packets to an instrument, such as inline tool (e.g., an intrusion prevention system, etc.). Also, a "network port" may be an example of the communication interface 20a, or the communication interface 24a. In other embodiments, the switch 70a may be configured such that the packets may be transmitted in a one-to-many configuration (i.e., from one network port to multiple instrument ports). In other embodiments, the switch 70 may be configured such that the packets may be transmitted in a many-to-many configuration (i.e., from multiple network ports to multiple instrument ports). In further embodiments, the switch 70 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the inline-bypass switch appliance 10a so that the packets (or certain types of packets) are routed according to any one of these configurations. In some embodiments, the packet movement configuration is predetermined such that when the inline-bypass switch appliance 10a receives the packets, the inline-bypass switch appliance 10a will automatically forward the packets to the ports based on the predetermined packet movement configuration (e.g., one-to-one, one-to-many, many-to-many, and many-to-one).

The controller 80a is configured to control the operation of the bypass component 60a and the switch 70a.

Although one communication interface 24a is shown connecting the first inline-bypass switch appliance 10a to the second inline-bypass switch appliance 10b, in other embodiments, there may be multiple communication interfaces 24a (e.g., ports) for communicating packets between the first and second inline-bypass switch appliances 10a, 10b. In such cases, there may be multiple bypass components 60a coupling to the respective communication interfaces 24a. Also, there may be multiple communication interfaces 20a coupling to the respective bypass components 60a for receiving packets from one or more network nodes 22.

The second inline-bypass switch appliance 10b has a first communication interface 20b for communication with the first inline-bypass switch appliance 10a, and a second communication interface 24b for communication with the second node 26. The second inline-bypass switch appliance 10b also has a third communication interface 30b and a fourth communication interface 32b for communication with an inline tool 50b. As shown in the figure, the inline-bypass switch appliance 10b also includes a bypass component 60b, a switch 70b, and a controller 80b. These components are accommodated in a housing 90b so that the inline-bypass switch appliance 10b may be transported, sold, and deployed as a unit.

In some cases, the first, second, third, and fourth communication interfaces 20b, 24b, 30b, 32b may be implemented using respective ports. For example, in some cases, the first communication interface 20b may comprise an appliance port for communication with the first inline-bypass switch appliance 10a, the second communication interface 24b may comprise a network port for communication with the node 26, the third communication interface 30b may comprise a first instrument port for communication with the inline tool 50b, and the fourth communication interface 32b may comprise a second instrument port for communication with the inline tool 50b. Also, in some cases, two or more of the ports may be combined, and be implemented as a single port.

The bypass component 60b is configured to selectively transmit packets received from the first inline-bypass switch appliance 10a to the switch 70b, or selectively bypass the switch 70b so that packets received at the first communication interface 20b will be passed directly through the bypass component 60b to the second communication interface 24b. In some cases, the bypass component 60b may include physical relays that can be opened or closed in response to one or more control signals. In other cases, the bypass component 60b may include logical relays that are implemented using software.

The switch 70b is configured to pass packets to the inline tool 50b via the third communication interface 30b. After the inline tool 50b processes the packets, the inline tool 50b then returns the packets to the inline-bypass switch appliance 10b through the fourth communication interface 32b. In the illustrated example, a pair of communication interfaces (i.e., communication interfaces 30b, 32b) is provided for one inline tool 50b. In other examples, the inline-bypass switch appliance 10b may include multiple pairs of communication interfaces for communication with multiple inline tools. The switch 70b is configured to forward the packets to one or more inline tools based on one or more parameters, such as IP source address, IP destination address, etc.

In one or more embodiments, the switch 70b may be configured to provide packet transmission in accordance with a pre-determined transmission scheme. In some embodiments, the switch 70b may be user-configurable such that packets may be transmitted in a one-to-one configuration (i.e., from one network port to an instrument port). A "network port" may be an example of the communication interface 20b, or the communication interface 24b. In other embodiments, the switch 70b may be configured such that the packets may be transmitted in a one-to-many configuration (i.e., from one network port to multiple instrument ports). In other embodiments, the switch 70b may be configured such that the packets may be transmitted in a many-to-many configuration (i.e., from multiple network ports to multiple instrument ports). In further embodiments, the switch 70b may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the inline-bypass switch appliance 10b so that the packets (or certain types of packets) are routed according to any one of these configurations. In some embodiments, the packet movement configuration is predetermined such that when the inline-bypass switch appliance 10b receives the packets, the inline-bypass switch appliance 10b will automatically forward the packets to the ports based on the predetermined packet movement configuration (e.g., one-to-one, one-to-many, many-to-many, and many-to-one).

The controller 80b is configured to control the operation of the bypass component 60b and the switch 70b.

Although one communication interface 20b is shown connecting the second inline-bypass switch appliance 10b to the first inline-bypass switch appliance 10a, in other embodiments, there may be multiple communication interfaces 20b (e.g., ports) for communicating packets between the first and second inline-bypass switch appliances 10a, 10b. In such cases, there may be multiple bypass components 60b coupling to the respective communication interfaces 20b. Also, there may be multiple communication interfaces 24b coupling to the respective bypass components 60b for outputting packets to one or more network nodes 26.

As shown in FIG. 4, each of the inline-bypass switch appliances 10a, 10b has the same configuration as that shown in FIG. 1, except that the appliance 10a has a communication interface 102a, and that the appliance 10b has a communication interface 102b, for communication with each other through a signaling link 110. The controller 80a and/or the controller 80b is configured to control the first inline-bypass switch appliance 10a and the second inline-bypass switch appliance 10b, so that the inline-bypass switch system 100 can be selectively placed in (1) a primary forwarding state, (2) a secondary forwarding state, or (3) a bypass state.

In the primary forwarding state, the first inline-bypass switch appliance 10a is configured to receive packet form the node 22, and pass the packet to the inline tool 50a through the switch 70a, while the second inline-bypass switch appliance 10b is configured to pass the packet for reception by the node 26 without going through the switch 70b and the inline tool 50b. The primary forwarding state may be achieved by opening the relays in the bypass component 60a in the first inline-bypass switch appliance 10a, and closing the relays in the bypass component 60b in the second inline-bypass switch appliance 10b.

In the secondary forwarding state, the first inline-bypass switch appliance 10a is configured to receive packet form the node 22, and pass the packet to the second inline-bypass switch appliance 10b without going through the switch 70a and the inline tool 50a. Such may be accomplished by closing the relays in the bypass component 60a in the first inline-bypass switch appliance 10a. The second inline-bypass switch appliance 10b receives the packet from the first inline-bypass switch appliance 10a, and passes the packet to the inline tool 50b through the switch 70b. Such may be accomplished by opening the relays in the bypass component 60b in the second inline-bypass switch appliance 10b. After the inline tool 50b processes the packet, the packet is transmitted back to the second inline-bypass switch appliance 10b, which then passes the packet for reception by the node 26.

In the bypass state, both the relays in the bypass component 60a in the first inline-bypass switch appliance 10a, and the relays in the bypass component 60b in the second inline-bypass switch appliance 10b, are closed. Accordingly, in the bypass state, the first inline-bypass switch appliance 10a receives packet from the node 22, and passes the packet to the second inline-bypass switch appliance 10b without going through the switch 70a and the inline tool 50a. The second inline-bypass switch appliance 10b receives the packet from the first inline-bypass switch appliance 10a, and passes the packet to the node 26 without going through the switch 70b and the inline tool 50b.

In one implementation, the controller 80a of the first inline-bypass switch appliance 10a (which functions as the primary switch appliance in the example) is configured to drive the signaling link "down" (e.g., provide a state signal "down" via the signaling link 110) whenever the first inline-bypass switch appliance 10a is down (which may be due to loss of power, etc.) so that it is unable to forward packets to the inline tool 50a. In this situation, the first bypass component 60a is in the relays-closed state, wherein the relays in the first bypass component 60a are closed. Also, the controller 80a of the first inline-bypass switch appliance 10a is configured to drive the signaling link "up" (e.g., provide a state signal "up" via the signaling link 110) whenever the first inline-bypass switch appliance 10a is up so that it is able to forward packets to the inline tool 50a. In this situation, the first bypass component 60a is in the relays-open state, wherein the relays in the first bypass component 60a are opened to pass packets to the switch 70a for forwarding packets to the inline tool 50a. The controller 80b of the second inline-bypass switch appliance 10b (which functions as the secondary switch appliance in this example) is configured to sense the state of the signaling link 110, and control the second bypass component 60b in the second inline-bypass switch appliance 10b based at least in part on the state signal provided by the signaling link 110. In particular, the controller 80b may be configured to control the bypass component 60b to place it in the relays-closed state whenever the signaling link 110 is sensed to be "up", or whenever packet forwarding path through the switch 70b for forwarding packets to the inline tool 50b has not been established (e.g., during boot-up of the appliance 10b, etc.). Also, the controller 80b may be configured to control the bypass component 60b to place it in the relays-open state whenever the signaling link 110 is sensed to be down, and when the packet forwarding path through the switch 70b for forwarding packets to the inline tool 50b has been established. Also, in one implementation, when the first inline-bypass switch appliance is unpowered, its bypass component 60a is naturally in the relays-closed state. Similarly, when the second inline-bypass switch appliance is unpowered, its bypass component 60b is naturally in the relays-closed state.

The primary forwarding state, the a secondary forwarding state, and the bypass state of the inline-bypass switch system 100 will be described in further detail below with reference to FIGS. 5-7.

Figure 5:
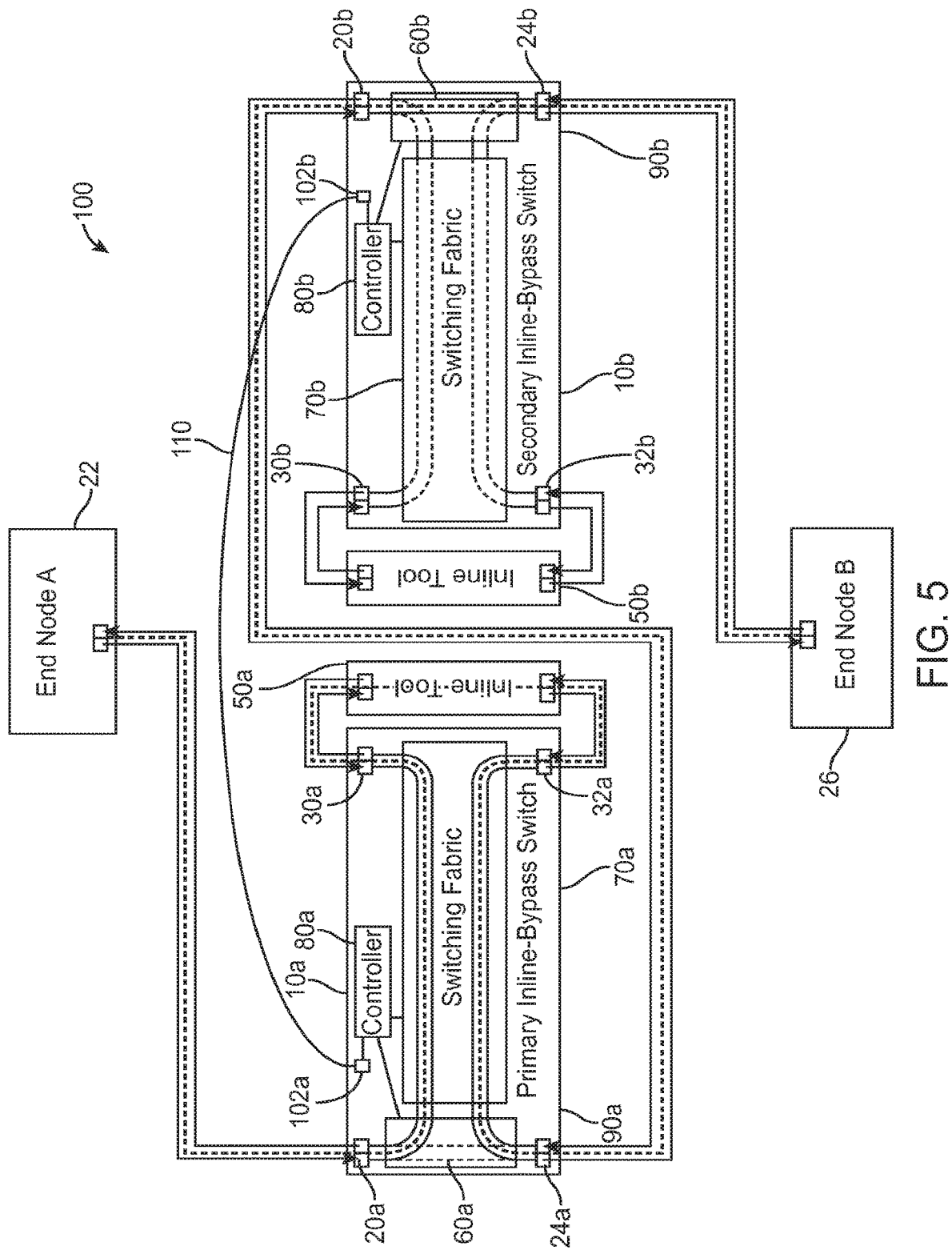
FIG. 5 illustrates the inline-bypass switch system of FIG. 4 in a primary forwarding state.

As shown in FIG. 5, the inline-bypass switch system 100 may be selectively placed in a primary forwarding state in which the first inline-bypass switch appliance is configured to forward packets to the inline tool 50a. Such may be performed in response to certain condition, e.g., when the first inline-bypass switch appliance 10a is up, and is able to forward packets to the inline tool 50a through its switch 70a.

In the primary forwarding state, a packet from the node 22 (which is a network transmitting node in the example) is received at the first communication interface 20a of the first inline-bypass switch appliance 10a. The relays in the bypass component 60a are opened to allow the packet to be passed to the switch 70a. The switch 70a then forwards the packet to the inline tool 50a through the third communication interface 30a at the first inline-bypass switch system 10a. After the inline tool 50a processes the packet, the inline tool 50a then transmits the packet to the fourth communication interface 32a at first inline-bypass switch apparatus 10a. The packet is processed by the switch 70a, which passes the packet to the second communication interface 24a. The packet exits from the communication interface 24a, and is transmitted to the first communication interface 20b at the second inline-bypass switch appliance 10b. In the second inline-bypass switch appliance 10b, the relays in the bypass component 60b are closed for allowing the packet to be transmitted to the second communication interface 24b for reception by the node 26 (which is a network receiving node in the example) without going through the switch 70b at the second inline-bypass switch appliance 10b.

In the illustrated embodiments, the controller 80a at the first inline-bypass switch apparatus 10a and the controller 80b at the second inline-bypass switch apparatus 10b are configured to communicate with each other so that the first controller 80a at the first inline-bypass switch apparatus 10a can control the bypass component 60a and the switch 70a in the first inline-bypass switch apparatus 10a, and the second controller 80b at the second inline-bypass switch apparatus 10b can control the bypass component 60b and the switch 70b in the second inline-bypass switch apparatus 10b, to achieve the primary forwarding state as that shown in FIG. 5. For example, to place the system 100 in the primary forwarding state, the controller 80a drives a state signal of "up" through the signaling link 110, informing the second inline-bypass switch appliance 10b that the first inline-bypass switch appliance 10a is in the packet forwarding state. The controller 80b at the second inline-bypass switch apparatus 10b controls the bypass component 60b based at least in part on the state signal. Since the state signal is "up" (representing that the first inline-bypass switch appliance 10a is forwarding packets to inline tool 50a via its switch 70a), the relays in the bypass component 60b in the second inline-bypass switch appliance 10b are closed.

Figure 6:
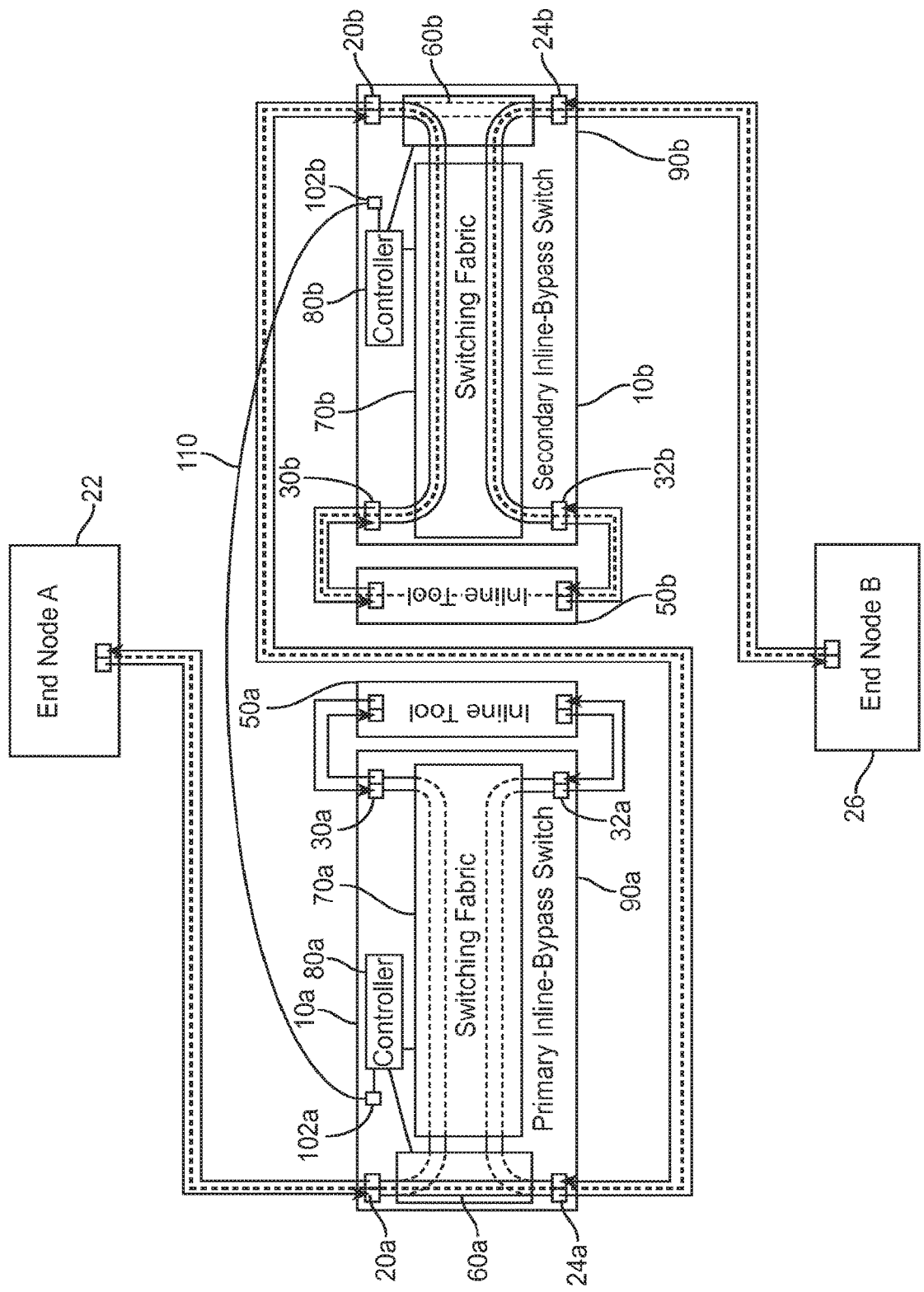
FIG. 6 illustrates the inline-bypass switch system of FIG. 4 in a secondary forwarding state.

As shown in FIG. 6, the inline-bypass switch system 100 may also be selectively placed in a secondary forwarding state, in which the second inline-bypass switch apparatus 10b is configured to forward packets to its associated inline tool 50b. Such may be performed in response to certain condition, e.g., when the first inline-bypass switch appliance 10a is down, when the first inline-bypass switch appliance 10a is being powered down, when the first inline-bypass switch appliance 10a is not capable of forwarding packets to its associated inline tool 50a, etc.

In the secondary forwarding state, a packet from the node 22 (which is a network transmitting node in the example) is received at the first communication interface 20a of the first inline-bypass switch appliance 10a. The relays in the bypass component 60a are closed to allow the packet to be passed to the second communication interface 24a without going through the switch 70a at the first inline-bypass switch appliance 10a. The packet exits from the communication interface 24a, and is transmitted to the first communication interface 20b at the second inline-bypass switch appliance 10b. In the second inline-bypass switch appliance 10b, the relays in the bypass component 60b are opened for passing the packet to the switch 70b in the second inline-bypass switch apparatus 10b. The switch 70b then forwards the packet to the inline tool 50b through the third communication interface 30b. After the inline tool 50b processes the packet, the inline tool 50b then transmits the packet to the fourth communication interface 32b at inline-bypass switch apparatus 10b. The packet is processed by the switch 70b, which passes the packet to the second communication interface 24b for forwarding to the node 26 (which is the network receiving node in the example).

In the illustrated embodiments, the controller 80a at the first inline-bypass switch apparatus 10a and the controller 80b at the second inline-bypass switch apparatus 10b are configured to communicate with each other so that the first controller 80a at the first inline-bypass switch apparatus 10a can control the bypass component 60a and the switch 70a in the first inline-bypass switch apparatus 10a, and the second controller 80b at the second inline-bypass switch apparatus 10b can control the bypass component 60b and the switch 70b in the second inline-bypass switch apparatus 10b, to achieve the secondary forwarding state as that shown in FIG. 6. For example, to place the system 100 in the secondary forwarding state, the controller 80a drives a state signal of "down" through the signaling link 110, informing the second inline-bypass switch appliance 10b that the first inline-bypass switch appliance 10a is not in the packet forwarding state. The controller 80b at the second inline-bypass switch apparatus 10b controls the bypass component 60b based at least in part on the state signal. Since the state signal is "down" (representing that the first inline-bypass switch appliance 10a not is forwarding packets to inline tool 50a via its switch 70a), the relays in the bypass component 60b in the second inline-bypass switch appliance 10b are opened, thereby allowing the switch 70b at the second inline-bypass switch appliance 10b to forward packets to the inline tool 50b.

Figure 7:
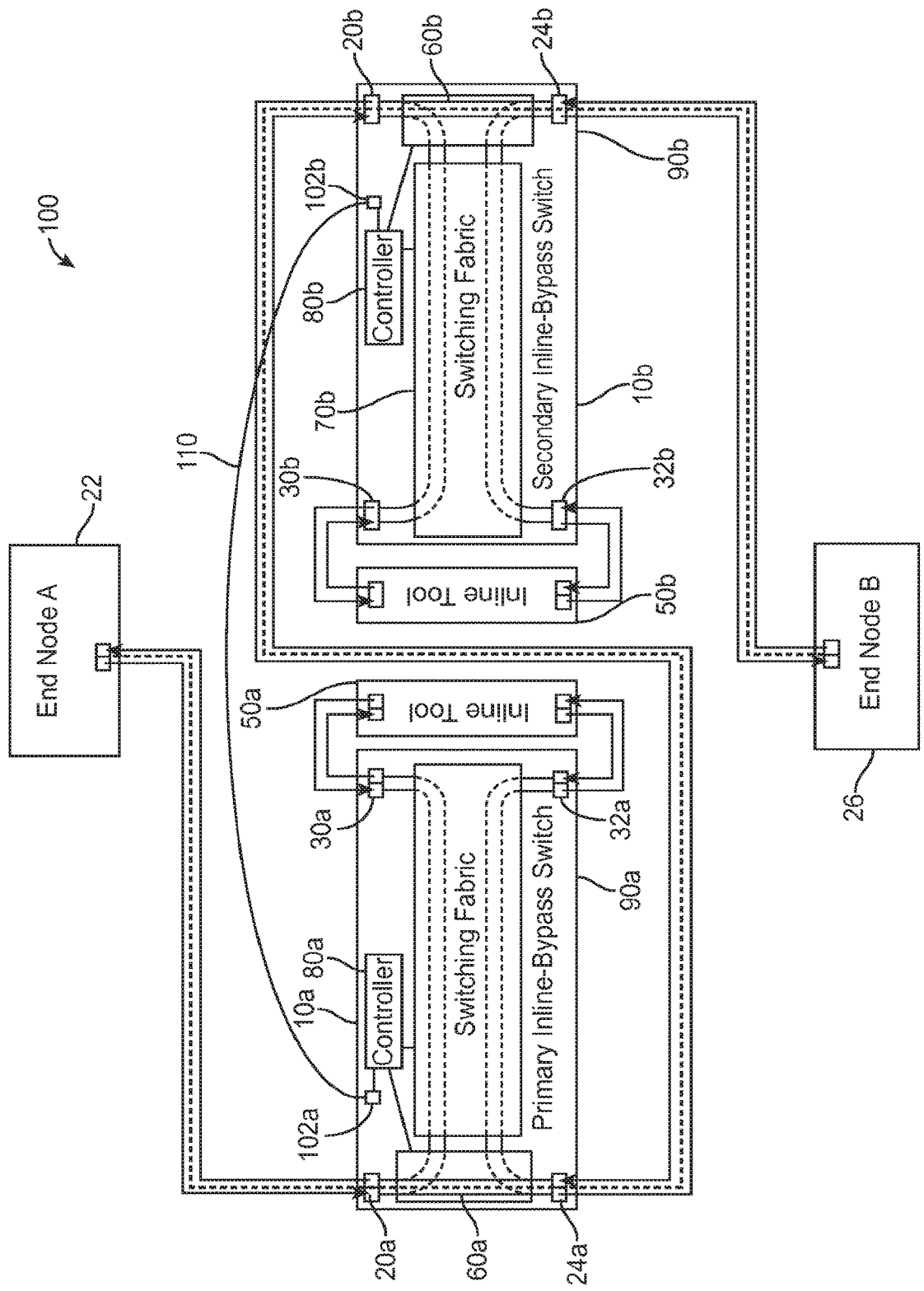
FIG. 7 illustrates the inline-bypass switch system of FIG. 4 in a bypass state.

As shown in FIG. 7, the inline-bypass switch system 100 may also be selectively placed in a bypass state, in which packets from the network transmitting node 22 is not forwarded to the inline tools 50a, 50b, but are instead passed to the network receiving node 26 without being processed by the inline tools 50a, 50b. Such may be performed in response to certain condition, e.g., when the first inline-bypass switch appliance 10a and the second inline-bypass switch appliance 10b are down, when the first inline bypass switch appliance 10a and the second inline-bypass switch appliance 10b are being powered down, when both of the switch appliances 10a, 10b are not capable of forwarding packets to their respective inline tools 50a, 50b, etc.

In the bypass state, a packet from the node 22 is received at the first communication interface 20a of the first inline-bypass switch appliance 10a. The relays in the bypass component 60a are closed to allow the packet to be passed to the second communication interface 24a without going through the switch 70a at the first inline-bypass switch appliance 10a. The packet exits from the communication interface 24a, and is transmitted to the first communication interface 20b at the second inline-bypass switch appliance 10b. In the second inline-bypass switch appliance 10b, the relays in the bypass component 60b are closed to allow the packet to be passed to the second communication interface 24b for reception by the network receiving node 26 without going through the switch 70b at the second inline-bypass switch appliance 10b.

In the illustrated embodiments, since the bypass components 60a, 60b are naturally in the relays-closed state, when both the first and second inline-bypass switch appliances 10a, 10b are down, the relays in the bypass components 60a, 60b are automatically closed. In the other embodiments, the controller 80a at the first inline-bypass switch apparatus 10a and the controller 80b at the second inline-bypass switch apparatus 10b are configured to communicate with each other so that the first controller 80a at the first inline-bypass switch apparatus 10a can control the bypass component 60a and the switch 70*a* in the first inline-bypass switch apparatus 10*a*, and the second controller 80*b* at the second inline-bypass switch apparatus 10*b* can control the bypass component 60*b* and the switch 70*b* in the second inline-bypass switch apparatus 10*b*, to achieve the bypass state as that shown in FIG. 7.

It should be noted that the direction of packet flow may be opposite from the examples described. For example, in other cases, the node 26 may be a network transmitting node, and the node 22 may be a network receiving node.

When the node 26 is a network transmitting node, in the primary forwarding state, a packet from the node 26 is received at the second communication interface 24*b* of the second inline-bypass switch appliance 10*b*. The relays in the bypass component 60*b* are opened to allow the packet to be passed to the switch 70*b*. The switch 70*b* then forwards the packet to the inline tool 50*b* through the fourth communication interface 32*b* at the second inline-bypass switch system 10*b*. After the inline tool 50*b* processes the packet, the inline tool 50*b* then transmits the packet to the third communication interface 30*b* at the second inline-bypass switch apparatus 10*b*. The packet is processed by the switch 70*b*, which passes the packet to the first communication interface 20*b*. The packet exits from the first communication interface 20*a*, and is transmitted to the second communication interface 24*a* at the first inline-bypass switch apparatus 10*a*. In the first inline-bypass switch appliance 10*a*, the relays in the bypass component 60*a* are closed for allowing the packet to be transmitted to the first communication interface 20*a* for reception by the node 22 (which is a network receiving node in the example) without going through the switch 70*a* at the first inline-bypass switch appliance 10*a*.

When the node 26 is a network transmitting node, in the secondary forwarding state, a packet from the node 26 is received at the second communication interface 24*b* of the second inline-bypass switch appliance 10*b*. The relays in the bypass component 60*b* are closed to allow the packet to be passed to the first communication interface 20*b* without going through the switch 70*b* at the second inline-bypass switch appliance 10*b*. The packet exits from the first communication interface 20*b*, and is transmitted to the second communication interface 24*a* at the first inline-bypass switch apparatus 10*a*. In the first inline-bypass switch appliance 10*a*, the relays in the bypass component 60*a* are opened for passing the packet to the switch 70*a* in the first inline-bypass switch apparatus 10*a*. The switch 70*a* then forwards the packet to the inline tool 50*a* through the fourth communication interface 32*a*. After the inline tool 50*a* processes the packet, the inline tool 50*a* then transmits the packet to the third communication interface 30*a* at the first inline-bypass switch apparatus 10*a*. The packet is processed by the switch 70*a*, which passes the packet to the first communication interface 20*a* for forwarding to the node 22 (which is the network receiving node in the example).

When the node 26 is a network transmitting node, in the bypass state, a packet from the node 26 is received at the second communication interface 24*b* of the second inline-bypass switch appliance 10*b*. The relays in the bypass component 60*b* are closed to allow the packet to be passed to the first communication interface 20*b* without going through the switch 70*b* at the second inline-bypass switch appliance 10*b*. The packet exits from the first communication interface 20*b*, and is transmitted to the second communication interface 24*a* at the first inline-bypass switch apparatus 10*a*. In the first inline-bypass switch appliance 10*a*, the relays in the bypass component 60*a* are closed to allow the packet to be passed to the first communication interface 20*a* for reception by the network receiving node 22 without going through the switch 70*a* at the first inline-bypass switch appliance 10*a*.

Figure 8A:
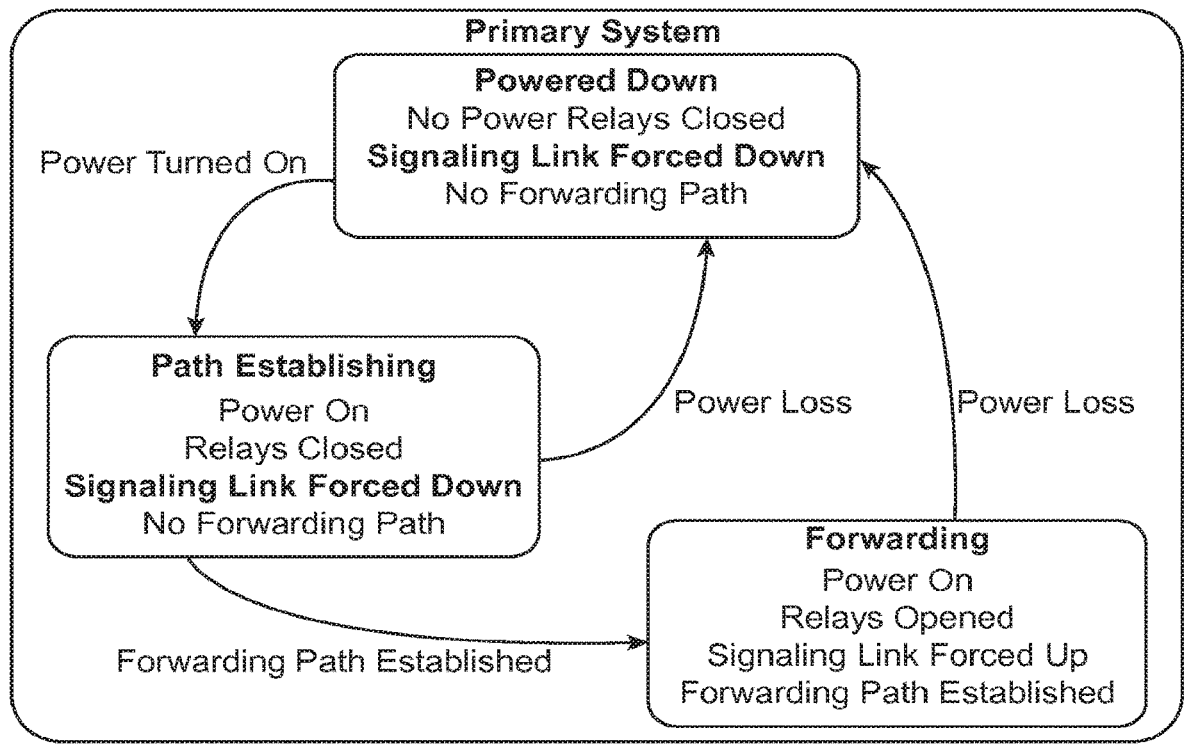
FIG. 8A illustrates a state diagram for the first inline-bypass switch appliance in the inline-bypass switch system of FIG. 4.
Figure 8B:
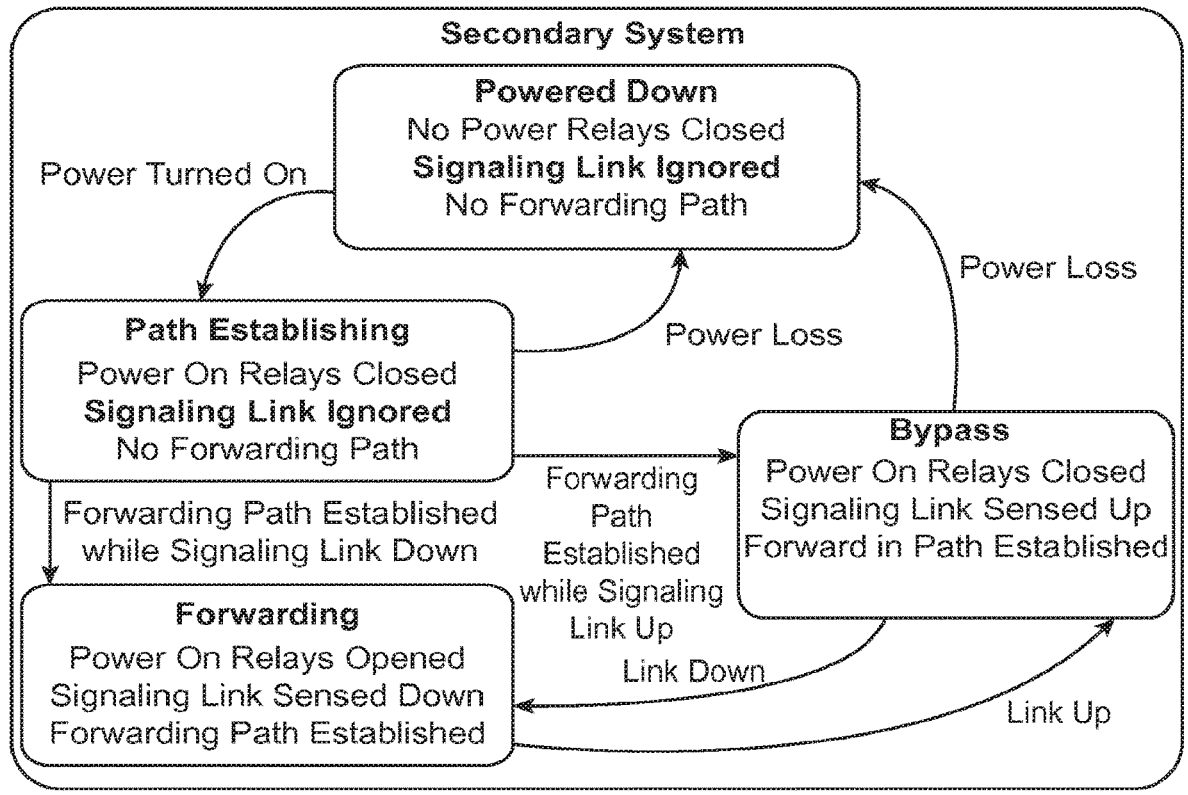
FIG. 8B illustrates a state diagram for the second inline-bypass switch appliance in the inline-bypass switch system of FIG. 4.
Figure 8C:
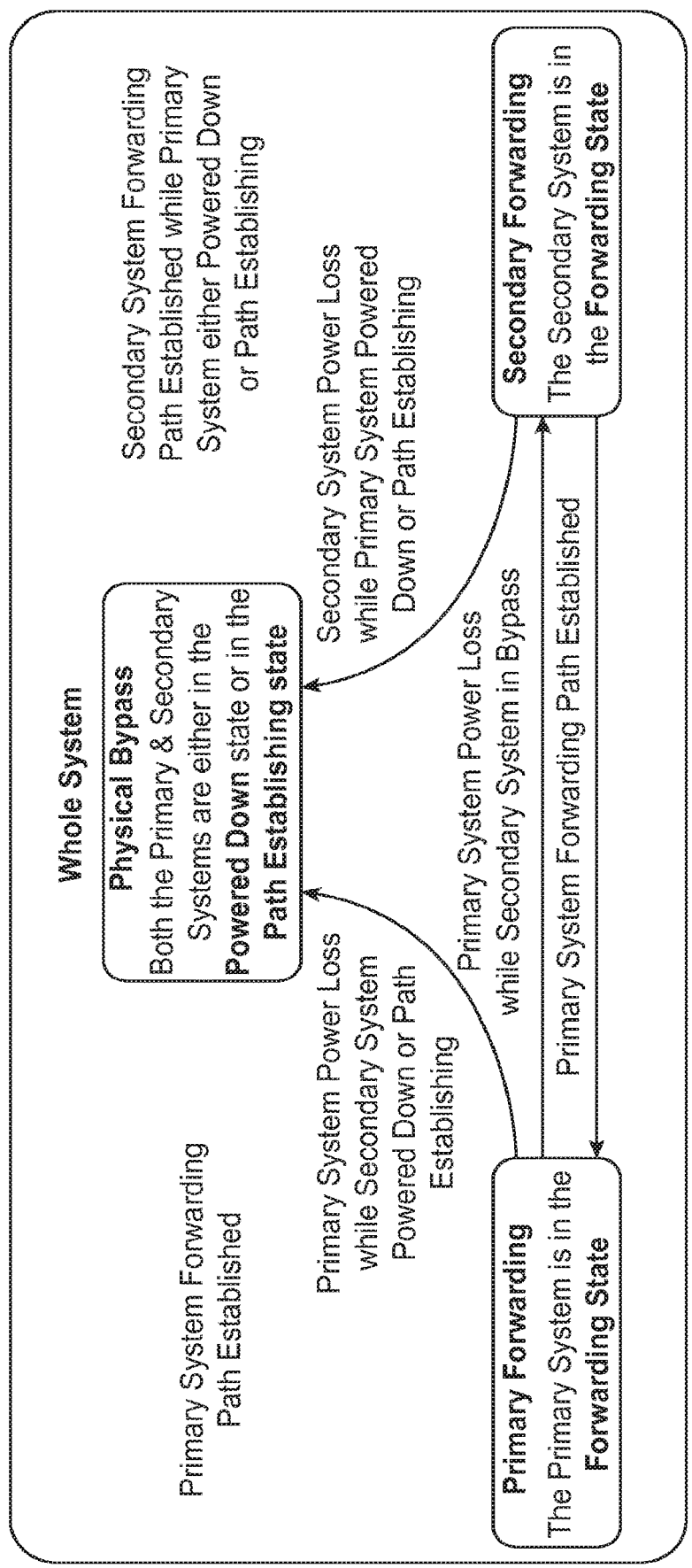
FIG. 8C illustrates a state diagram for the inline-bypass switch system of FIG. 4.

As discussed, the inline-bypass switch system 100 can be selectively placed in (1) the primary forwarding state, (2) the secondary forwarding state, or (3) the bypass state. FIGS. 8A-8C illustrate, respectively, a state diagram for the primary system (which may be one of the first inline-bypass switch appliance 10*a* and the second inline-bypass switch appliance 10*b*), a state diagram for the secondary system (which may be the other one of the first inline-bypass switch appliance 10*a* and the second inline-bypass switch appliance 10*b*), and a state diagram for the inline-bypass switch system 100 that includes the first inline-bypass switch appliance 10*a* and the second inline-bypass switch appliance 10*b*. For the purpose of the discussion below, it will be assumed that the first inline-bypass switch appliance 10*a* is the primary system, and that the second inline-bypass switch appliance 10*b* is the secondary system. However, the scenario may be reversed.

As shown in the state diagram in FIG. 8A for the primary system (i.e., the first inline-bypass switch appliance 10*a* in the example), the first inline-bypass switch appliance 10*a* may be in a powered down state, in a path establishing state, or in a forwarding state. When the first inline-bypass switch appliance 10*a* is in the powered down state, the inline-bypass switch appliance 10*a* has no power (e.g., due to power loss, or power is turned off), the relays in the bypass component 60*a* are closed, the signaling link 110 transmits a state signal of "down" (indicating that the relays in the bypass component 60*a* in the first inline-bypass switch appliance 10*a* are closed) from the first inline-bypass switch appliance 10*a* to the second inline-bypass switch appliance 10*b*, and there is no packet forwarding path established for forwarding packet to the inline tool 50*a* (i.e., no packet forwarding path through the switch 70*a*).

When power is turned on at the first inline-bypass switch appliance 10*a*, the inline-bypass switch appliance 10*a* is then placed in the path establishing state. In the path establishing state, the power in the first inline-bypass switch appliance 10*a* is on, the relays in the bypass component 60*a* are closed, the state signal transmitted by the signaling link 110 is still "down", and there is no packet forwarding path for forwarding packet to the inline tool 50*a* (i.e., no packet forwarding path through the switch 70*a*). There is no packet forwarding path because the path is in the progress of being established, and has not yet been established.

After a forwarding path for forwarding packet to the inline tool 50*a* has been established, the first inline-bypass switch appliance 10*a* is then in the forwarding state. In the forwarding state, the power in the first inline-bypass switch appliance 10*a* remains on, the relays in the bypass component 60*a* are opened, the signaling link 110 transmits a state signal of "up" (indicating that the relays in the bypass component 60*a* in the first inline-bypass switch appliance 10*a* are opened) from the first inline-bypass switch appliance 10*a* to the second inline-bypass switch appliance 10*b*, and the forwarding path has been established.

If there is a power loss, or a powered down command, then the first inline-bypass switch appliance 10*a* may be placed back in the powered down state. The powered down command may be generated by the controller 80*a*, or a user command that is received by the first inline-bypass switch appliance 10*a*.

As shown in the state diagram in FIG. 8B for the secondary system (i.e., the second inline-bypass switch appliance 10b in the example), the second inline-bypass switch appliance 10b may be in a powered down state, in a path establishing state, in a forwarding state, or in a bypass state. When the second inline-bypass switch appliance 10b is in the powered down state, the inline-bypass switch appliance 10b has no power (e.g., due to power loss, or power is turned off), the relays in the bypass component 60b are closed, signal from the signaling link 110 is ignored, and there is no packet forwarding path established for forwarding packet to the inline tool 50b (i.e., no packet forwarding path through the switch 70b).

When power is turned on at the second inline-bypass switch appliance 10b, the inline-bypass switch appliance 10b is then placed in the path establishing state. In the path establishing state, the power in the second inline-bypass switch appliance 10b is on, the relays in the bypass component 60b remains closed, signal from the signaling link 110 is ignored, and there is still no packet forwarding path established for forwarding packet to the inline tool 50b.

After a forwarding path for forwarding packet to the inline tool 50b has been established, the second inline-bypass switch appliance 10b may then be placed in either the forwarding state or the bypass state. If the signaling link 110 has sent a state signal of "down" from the first inline-bypass switch appliance 10a to the second inline-bypass switch appliance 10b, the second inline-bypass switch appliance 10b is then placed in the forwarding state. On the other hand, if the signaling link 110 has sent a state signal of "up" from the first inline-bypass switch appliance 10a to the second inline-bypass switch appliance 10b, then then second inline-bypass switch appliance 10b is placed in the bypass state. In the forwarding state, the power in the second inline-bypass switch appliance 10b remains on, the relays in the bypass component 60b are opened, the signaling link 110 has transmitted a state signal of "down" (indicating that the relays in the bypass component 60a in the first inline-bypass switch appliance 10a are closed), and the forwarding path (for forwarding packets to the inline tool 50b) has been established. When the second inline-bypass switch appliance 10b is in the forwarding state, packets may be forwarded to the inline tool 50b through the switch 70b in the second inline-bypass switch appliance 10b In some cases, if the signaling link 110 has transmitted a state signal of "up" from the first inline-bypass switch appliance 10a to the second inline-bypass switch appliance 10b, then the second inline-bypass switch appliance 10b is transitioned into the bypass state. In the bypass state, the relays in the bypass component 60b are closed, thereby allowing packets to be passed through the second inline-bypass switch appliance 10b without having the packets go through the switch 70b and the inline tool 50b. If the signaling link 110 later sends a state signal of "down" (indicating that the relays in the bypass component 60a in the first inline-bypass switch appliance 10a are closed), then the second inline-bypass switch appliance 10b is placed in the forwarding state, wherein packets are forwarded to the inline tool 50b through the switch 70b in the second inline-bypass switch appliance 10b, as discussed.

If there is a power loss, or a powered down command, then the second inline-bypass switch appliance 10b may be placed back in the powered down state.

As shown in the state diagram in FIG. 8C for the inline-bypass switch system 100, the inline-bypass switch system 100 may be (1) in the primary forwarding state where one of the first and second inline-bypass switch appliances 10a, 10b performs packet forwarding to its associated inline tool 50a/50b, (2) in the secondary forwarding state where the other one of the first and second inline-bypass switch appliances 10a, 10b performs packet forwarding to its associated inline tool 50a/50b, or (3) in the bypass state where the first and second inline-bypass switch appliances 10a, 10b cooperate with each other to pass packet from the node 22 to the node 26 without having the packet processed by the inline tools 50a, 50b. For the purpose of the discussion below, it will be assumed that the first inline-bypass switch appliance 10a performs packet forwarding to its associated inline tool 50a in the primary forwarding state, and that the second inline-bypass switch appliance 10b performs packet forwarding to its associated inline tool 50b in the secondary forwarding state. However, the scenario may be reversed.

The inline-bypass switch system 100 can be placed in the primary forwarding state whenever the first inline-bypass switch appliance 10a has a forwarding path established for passing packets to the inline tool 50a.

The inline-bypass switch system 100 can be placed in the secondary forwarding state whenever the first inline-bypass switch appliance 10a has a power loss while the second inline-bypass switch appliance 10b is in the bypass state (i.e., so that the second inline-bypass switch appliance 10b is readily switchable to the forwarding state).

However, if the first inline-bypass switch appliance 10a has a power loss while the second inline-bypass switch appliance 10b is in the powered down state or path establishing state (i.e., so that the second inline-bypass switch appliance 10b is not ready to be placed in the forwarding state—see state diagram for the second inline-bypass switch appliance 10b), then the system 100 is placed in the bypass state.

Similarly, if the second inline-bypass switch appliance 10b has a power loss while the first inline-bypass switch appliance 10a is in the powered down state or in the path establishing state (i.e., so that the first inline-bypass switch appliance 10a is not ready to be placed in the forwarding state—see state diagram for the first inline-bypass switch appliance 10a), then the system 100 is placed in the bypass state.

Figures 9A, 9B:
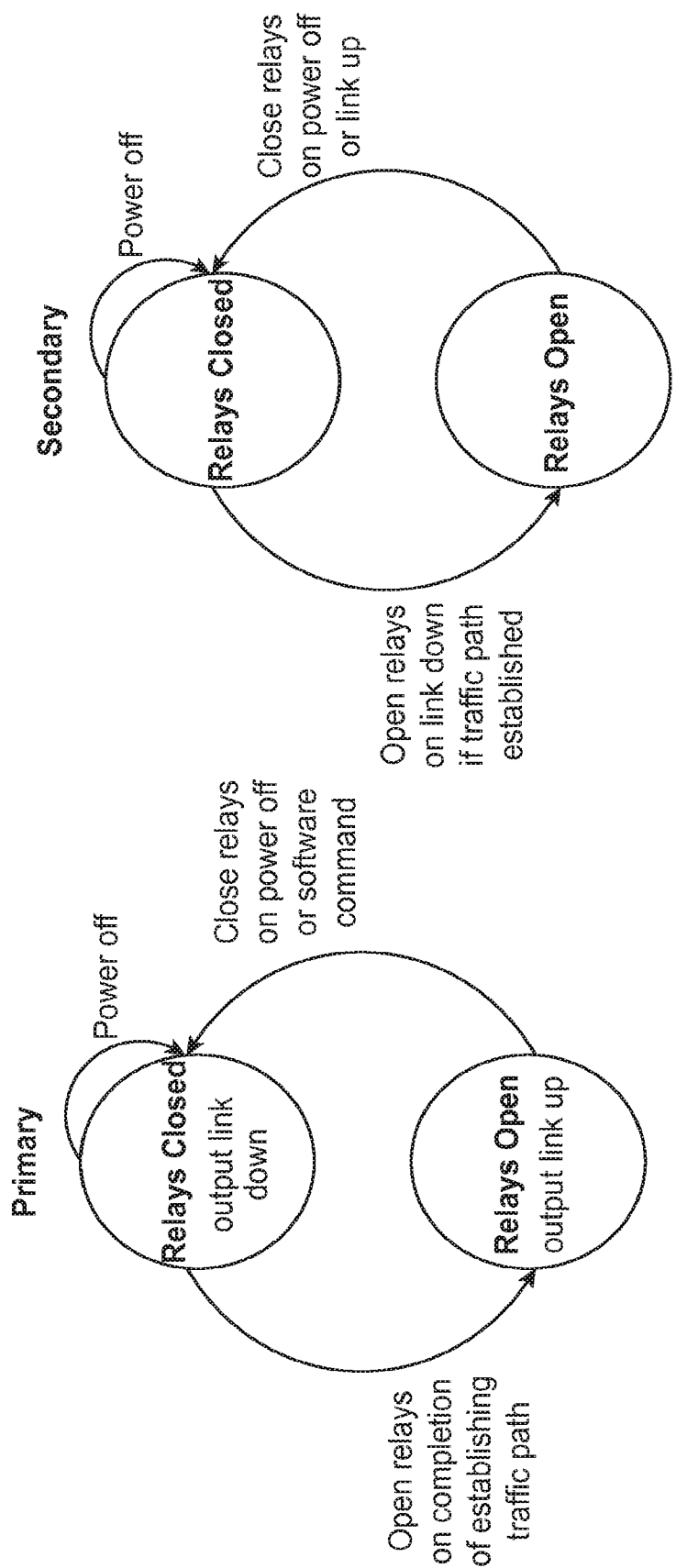
FIGS. 9A-9B illustrate state diagrams for the bypass components in the inline-bypass switch system of FIG. 4.

FIGS. 9A-9B illustrate state diagrams for the bypass components 60a, 60b in the first and second inline-bypass switch appliances 10a, 10b, respectively. As shown in FIG. 9A, the bypass component 60a in the first inline-bypass switch appliance 10a may be in a relays-closed state or a relays-open state. The bypass component 60a is in the relays-closed state by closing its relays when power at the first inline-bypass switch appliance 10a is turned off or is lost, or may be forced to be closed by the controller 80a in response to a command, such as a software command, to force the relays to close. The bypass component 60a may be transitioned from the relays-closed state to the relays-open state by opening the relays therein when the traffic path (for forwarding packets to the inline tool 50a) has been established at the first inline-bypass switch appliance 10a.

As shown in FIG. 9B, the bypass component 60b in the second inline-bypass switch appliance 10b may also be in a relays-closed state or a relays-open state. The bypass component 60b is in the relays-closed state by closing its relays when power at the second inline-bypass switch appliance 10b is turned off, or when the signaling link 110 is between the first and second inline-bypass switch appliances 10a, 10b is transmitting an "up" signal. In one implementation, when the bypass component 60a is in the relays-open state (corresponding to the situation when the first inline-bypass switch appliance 10a is up), the controller 80a at the first inline-bypass switch appliance 10a sends a state signal (e.g., an "up" signal) to the second inline-bypass switch appliance 10b through the communication interface 102a, to indicate that the bypass component 60a is in the relays-open state. In such situation, the bypass component 60b may be placed in the relays-closed state.

The bypass component 60b is transitioned from the relays-closed state to the relays-open state by opening the relays therein when the signaling link 110 is transmitting a state signal of "down", and if the traffic path (for forwarding packets to the inline tool 50b) has been established at the second inline-bypass switch appliance 10b. In one implementation, when the bypass component 60a is in the relays-closed state (corresponding to the situation when the first inline-bypass switch appliance 10a is down), the controller 80a at the first inline-bypass switch appliance 10a sends a state signal (e.g., a "down" signal) to the second inline-bypass switch appliance 10b through the communication interface 102a, to indicate that the bypass component 60a is in the relays-closed state. In such situation, and if the packet forwarding path through the switch 70b has already been established, then the bypass component 60b may be placed in the relays-open state.

Figure 10:
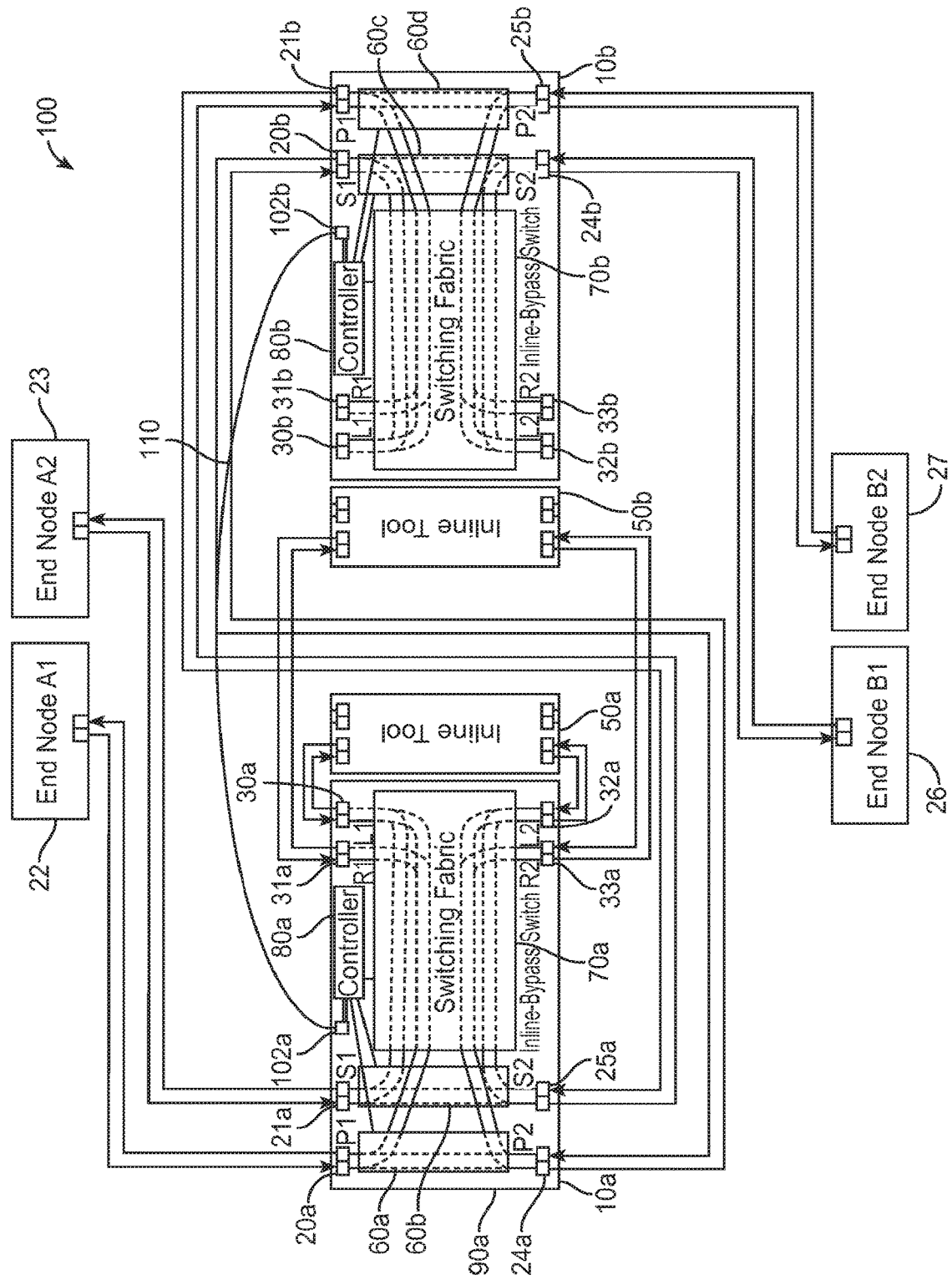
FIG. 10 illustrates another inline-bypass switch system that includes two inline-bypass switch appliances.

FIG. 10 illustrates another inline-bypass switch system 100 in accordance with other embodiments. The inline-bypass switch system 100 includes a first inline-bypass switch appliance 10a, and a second inline-bypass switch appliance 10b. The inline-bypass switch system 100 is configured to communicate packets between network nodes 22, 23 and network nodes 26, 27.

In some cases, the node A1 22 and the node A2 23 may belong to a same entity, in which cases, the node A1 22 and the node A2 23 may be redundant nodes for load sharing. In other cases, the node A1 22 and the node A2 23 may belong to different respective users or entities, and may be unrelated to each other. Similarly, in some cases, the node B1 26 and the node B2 27 may belong to a same entity, in which cases, the node B1 26 and the node B2 27 may be redundant nodes for load sharing. In other cases, the node B1 26 and the node B2 27 may belong to different respective users or entities, and may be unrelated to each other.

The inline-bypass switch appliance 10a has a first communication interface 20a for communication with a first node A1 22, and a second communication interface 24a for communication with the second inline-bypass switch appliance 10b. The inline-bypass switch appliance 10a also includes a third communication interface 21a for communication with a third node A2 23, and a fourth communication interface 25a for communication with the second inline-bypass switch appliance 10b.

The inline-bypass switch appliance 10a also has a fifth communication interface 30a and a sixth communication interface 32a for communication with an inline tool 50a, and a seventh communication interface 31a and an eighth communication interface 33a for communication with an inline tool 50b.

As shown in the figure, the inline-bypass switch appliance 10a also includes a first bypass component 60a, a second bypass component 60b, a switch 70a, and a controller 80a. These components are accommodated in a housing 90a so that the inline-bypass switch appliance 10a may be transported, sold, and deployed as a unit.

The first bypass component 60a is configured to selectively transmit packets received from the node A1 22 to the switch 70a, or selectively bypass the switch 70a so that packets received at the first communication interface 20a will be passed directly through the bypass component 60a to the second communication interface 24a.

The second bypass component 60b is also configured to selectively transmit packets received from the node A2 23 to the switch 70a, or selectively bypass the switch 70a so that packets received at the third communication interface 21a will be passed directly through the bypass component 60a to the fourth communication interface 25a.

The switch 70a is configured to pass packets to the inline tool 50a via the fifth communication interface 30a. After the inline tool 50a processes the packets, the inline tool 50a then returns the packets to the first inline-bypass switch appliance 10a through the sixth communication interface 32a.

The switch 70a is also configured to pass packets to the inline tool 50b via the seventh communication interface 31a. After the inline tool 50b processes the packets, the inline tool 50b then returns the packets to the first inline-bypass switch appliance 10a through the eighth communication interface 33a.

In the illustrated example, two pairs of communication interfaces (i.e., communication interfaces 30a, 32a, and communication interfaces 31a, 33a) are provided for the two inline tools 50a, 50b, respectively. In other examples, the inline-bypass switch appliance 10a may include more than two pairs of communication interfaces for communication with more than two inline tools. The switch 70a is configured to forward the packets to one or more inline tools based on one or more parameters, such as IP source address, IP destination address, etc.

The controller 80a is configured to control the operation of the first bypass component 60a, the second bypass component 60b, and the switch 70a.

The second inline-bypass switch appliance 10b has a first communication interface 20b for communication with the first inline-bypass switch appliance 10a through the second communication interface 24a at the first inline-bypass switch appliance 10a, and a second communication interface 24b for communication with a second node B1 26. The second inline-bypass switch appliance 10b also includes a third communication interface 21b for communication with the first inline-bypass switch appliance 10a through the fourth communication interface 25a at the first inline-bypass switch appliance 10a, and a fourth communication interface 25b for communication with a fourth node B2 27.

The second inline-bypass switch appliance 10b also has a fifth communication interface 30b and a sixth communication interface 32b for communication with an inline tool 50b, and a seventh communication interface 31b and an eighth communication interface 33b for communication with an inline tool 50a.

As shown in the figure, the second inline-bypass switch appliance 10b also includes a first bypass component 60c, a second bypass component 60d, a switch 70b, and a controller 80b. These components are accommodated in a housing 90b so that the second inline-bypass switch appliance 10b may be transported, sold, and deployed as a unit.

The bypass component 60c is configured to selectively transmit packets received at the first communication interface 20b of the second inline-bypass switch appliance 10b to the switch 70b, or selectively bypass the switch 70b so that packets received at the first communication interface 20b will be passed directly through the bypass component 60c to the second communication interface 24b (for reception by the node B2 26).

The bypass component 60d is configured to selectively transmit packets received at the third communication interface 21b of the second inline-bypass switch appliance 10b to the switch 70b, or selectively bypass the switch 70b so that packets received at the third communication interface 21b will be passed directly through the bypass component 60d to the fourth communication interface 25b (for reception by the node B2 27).

The switch 70b is configured to pass packets to the inline tool 50b via the fifth communication interface 30b. After the inline tool 50b processes the packets, the inline tool 50b then returns the packets to the second inline-bypass switch appliance 10b through the sixth communication interface 32b.

The switch 70b is also configured to pass packets to the inline tool 50a via the seventh communication interface 31b. After the inline tool 50a processes the packets, the inline tool 50a then returns the packets to the second inline-bypass switch appliance 10b through the eighth communication interface 33b.

In the illustrated example, two pairs of communication interfaces (i.e., communication interfaces 30b, 32b, and communication interfaces 31b, 33b) are provided for the two inline tools 50b, 50a, respectively. In other examples, second the inline-bypass switch appliance 10b may include more than two pairs of communication interfaces for communication with more than two inline tools. The switch 70b is configured to forward the packets to one or more inline tools based on one or more parameters, such as IP source address, IP destination address, etc.

The controller 80b is configured to control the operation of the first bypass component 60c, the second bypass component 60d, and the switch 70b in the second inline-bypass switch appliance 10b.

As shown in FIG. 10, the appliance 10a has a communication interface 102a, and that the appliance 10b has a communication interface 102b, for communication with each other through a signaling link 110. The controller 80a and/or the controller 80b is configured to control the first inline-bypass switch appliance 10a and the second inline-bypass switch appliance 10b, so that the inline-bypass switch system 100 can be selectively placed in (1) a multi-operational state, (2) a primary-operational state, (3) a secondary-operational state, or (4) a bypass state.

Figure 11:
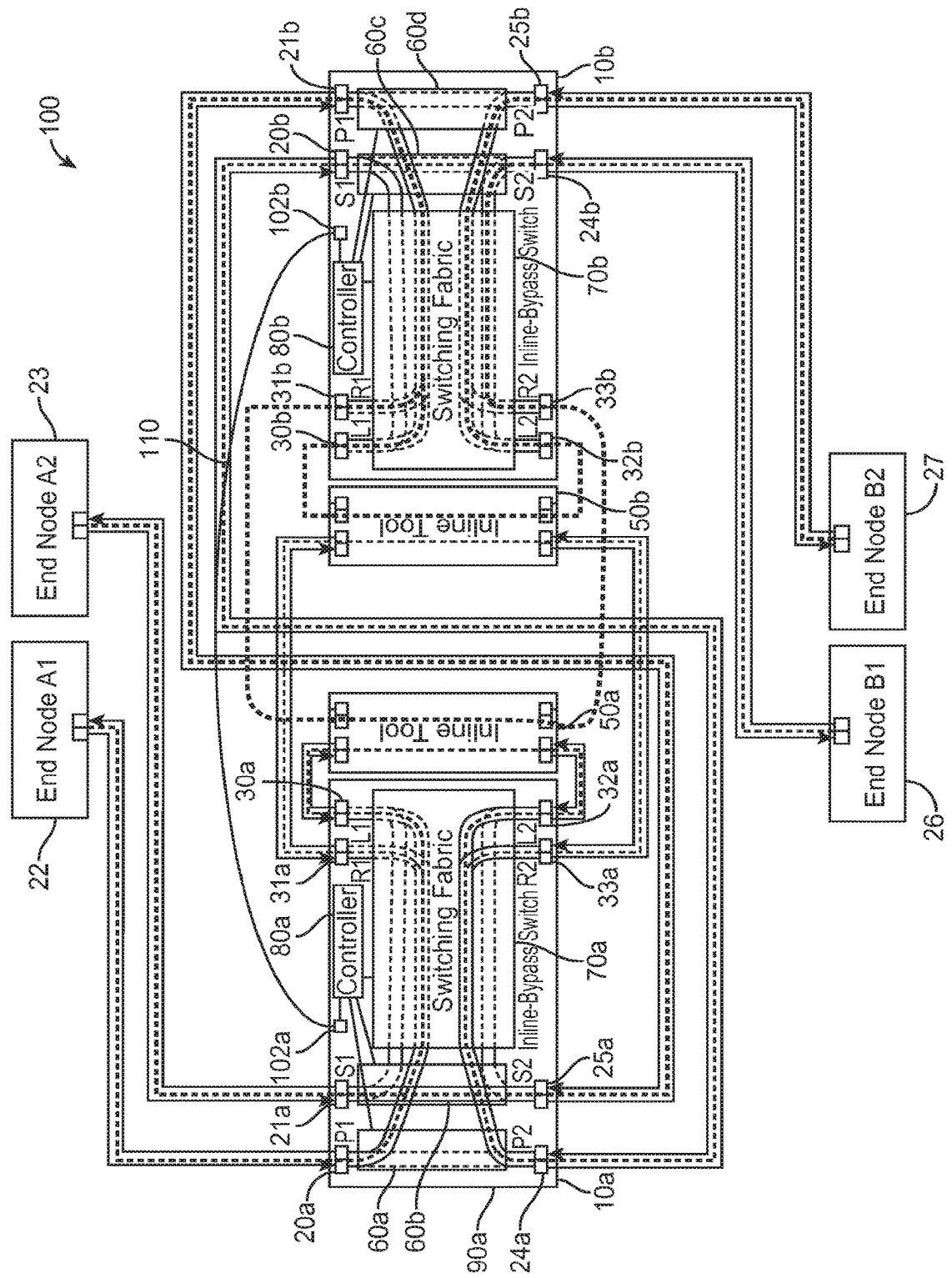
FIG. 11 illustrates the inline-bypass switch system of FIG. 10 when both appliances are operational.

FIG. 11 shows the inline-bypass switch system 100 in the multi-operational state. In the multi-operational state, the first inline-bypass switch appliance 10a is configured to receive packets from the node 22 through the first communication interface 20a. The relays in the first bypass component 60a are opened to pass the packets to the switch 70a. The switch 70a then forwards the packets to the inline tools 50a, 50b through the fifth communication interface 30a and the seventh communication interface 31a, respectively. After the packets are processed by the inline tools 50a, 50b, they are returned back to the first inline-bypass switch appliance 10a at the sixth communication interface 32a, and the eighth communication interface 33a, respectively. The packets are transmitted through the switch 70a and the first bypass component 60a, and are output at the second communication interface 24a of the first inline-bypass switch appliance 10a for reception by the first communication interface 20b at the second inline-bypass switch appliance 10b. At the second inline-bypass switch appliance 10b, the relays in the first bypass component 60c are closed, thereby passing the packets through the first bypass component 60c without having the packets processed by the switch 70b. The packets are then transmitted out of the second communication interface 24b for reception by the node 26.

Also in the multi-operational state, the node 23 transmits packets for reception at the third communication interface 21a at the first inline-bypass switch appliance 10a. The relays in the second bypass component 60b at the first inline-bypass switch appliance 10a are closed, thereby passing the packets to the fourth communication interface 25a without having the packets processed by the switch 70a. The packets are then output from the fourth communication interface 25a for reception by the third communication interface 21b at the second inline-bypass switch appliance 10b. The relays in the second bypass component 60d at the second inline-bypass switch appliance 10b are opened, thereby passing the packets to the switch 70b. The switch 70b then forwards the packets to the inline tool 50b, and the inline tool 50a through the fifth communication interface 30b and the seventh communication interface 31b, respectively. After the inline tools 50b, 50a process the packets, the packets are returned back to the second inline-bypass switch appliance 10b at the sixth communication interface 32b and the eighth communication interface 33b, respectively. The packets are transmitted through the switch 70b and the second bypass component 60d, and are output at the fourth communication interface 25b for reception by the node 27.

Accordingly, as shown in the above example, in the multi-operational state, packets from the transmitting node 22 are processed by the switch 70a in the first inline-bypass switch appliance 10a, and are processed by the inline tools 50a, 50b. Also, packets from the transmitting node 23 are processed by the switch 70b in the second inline-bypass switch appliance 10b, and are processed by the inline tools 50a, 50b. This configuration is advantageous because the first and second inline-bypass switch appliances 10a, 10b can be configured to share loads between the nodes 22, 23. Also, the inline tools 50a, 50b can be configured to share loads from the node 22, and also to share loads from the node 23.

Although the above example is described with reference to the nodes 22, 23 being network transmitting nodes, in other cases, the nodes 22, 23 may be network receiving nodes. In such cases, the nodes 26, 27 are network transmitting nodes, and the above described packet flow may be reversed in direction.

Figure 12:
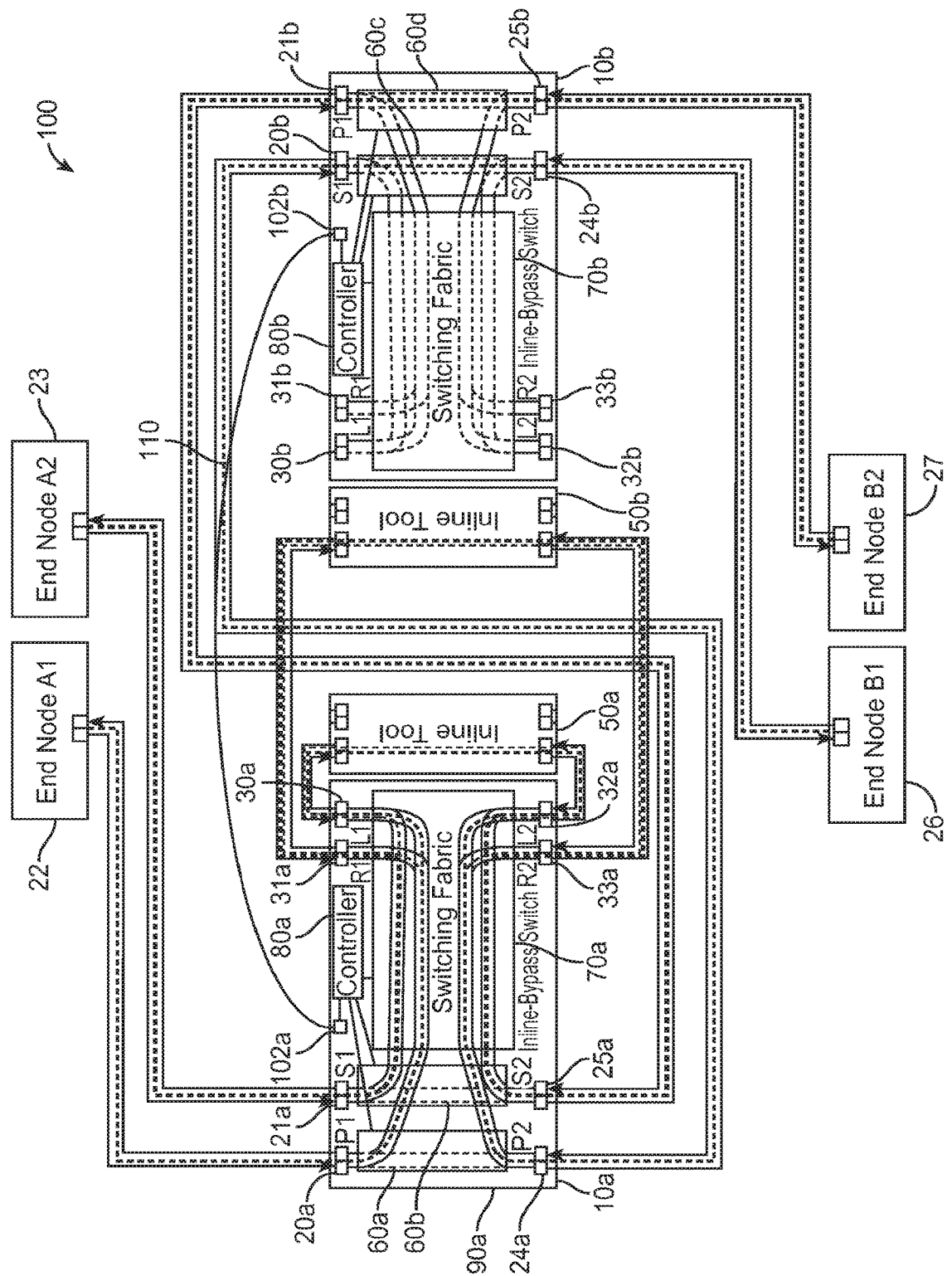
FIG. 12 illustrates the inline-bypass switch system of FIG. 10 when one of the appliances is in a bypass state.

FIG. 12 shows the inline-bypass switch system 100 in the primary-operational state. In the primary operational state, the second inline-bypass switch appliance 10b fails to forward packets from the nodes 22, 23 to the inline tools 50a, 50b, and the first inline-bypass switch appliance 10a is configured to forward packets from the nodes 22, 23 to the inline tools 50a, 50b. In the primary operational state, the first communication interface 20a receives packets from the node 22. The relays in the first bypass component 60a are opened, thereby passing the packets to the switch 70a. The switch 70a forwards the packets to the inline tools 50a, 50b through the fifth communication interface 30a and the seventh communication interface 31a, respectively. After the inline tools 50a, 50b process the packets, the inline tools 50a, 50b return the packets to the first inline-bypass switch appliance 10a at the sixth communication interface 32a and the eighth communication interface 33a, respectively. The packets are transmitted through the switch 70a, and the first bypass component 60a. The packets are then output through the second communication interface 24a for reception by the first communication interface 20b at the second inline-bypass switch appliance 10b. At the second inline-bypass switch appliance 10b, the relays in the first bypass component 60c are closed, thereby passing the packets through the first bypass component 60c without having the packets processed by the switch 70b. The packets are output at the second communication interface 24b for reception by the node 26.

Also in the primary-operational state, the third communication interface 21a receives packets from the node 23.

The relays in the second bypass component 60*b* are opened, thereby passing the packets to the switch 70*a*. The switch 70*a* forwards the packets to the inline tools 50*a*, 50*b* through the fifth communication interface 30*a* and the seventh communication interface 31*a*, respectively. After the inline tools 50*a*, 50*b* process the packets, the inline tools 50*a*, 50*b* return the packets to the first inline-bypass switch appliance 10*a* at the sixth communication interface 32*a* and the eighth communication interface 33*a*, respectively. The packets are transmitted through the switch 70*a*, and the second bypass component 60*b*. The packets are then output through the fourth communication interface 25*a* for reception by the third communication interface 21*b* at the second inline-bypass switch appliance 10*b*. At the second inline-bypass switch appliance 10*b*, the relays in the second bypass component 60*d* are closed, thereby passing the packets through the first bypass component 60*d* without having the packets processed by the switch 70*b*. The packets are output at the fourth communication interface 25*b* for reception by the node 27.

Accordingly, as shown in the example, even if the second inline-bypass switch appliance 10*b* is down, the first inline-bypass switch appliance 10*a* can still forward packets from the nodes 22, 23 to the inline tools 50*a*, 50*b*, and then pass the packets to the receiving nodes 26, 27.

Although the above example is described with reference to the nodes 22, 23 being network transmitting nodes, in other cases, the nodes 22, 23 may be network receiving nodes. In such cases, the nodes 26, 27 are network transmitting nodes, and the above described packet flow may be reversed in direction.

Figure 13:
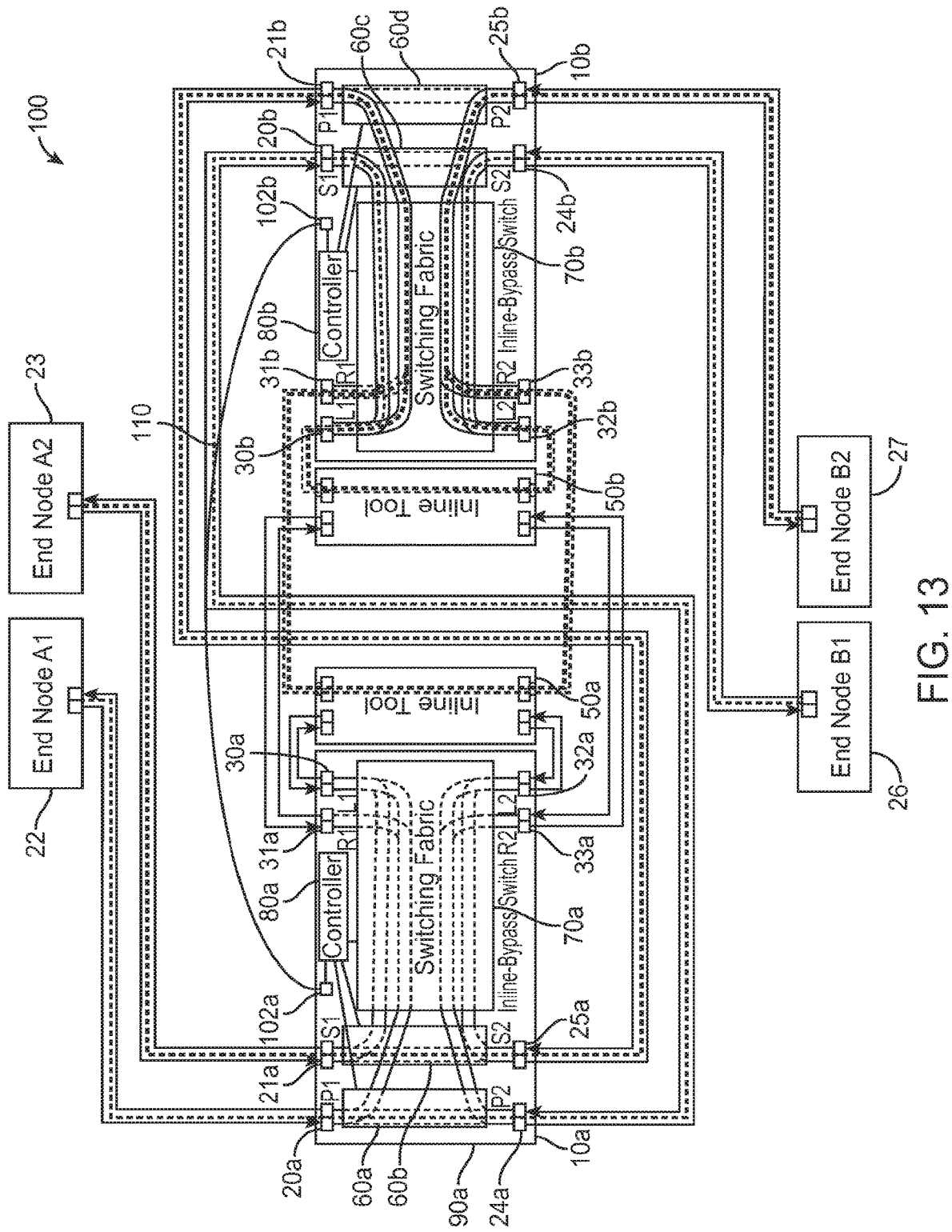
FIG. 13 illustrates the inline-bypass switch system of FIG. 10 when another one of the appliances is in a bypass state.

FIG. 13 shows the inline-bypass switch system 100 in the secondary-operational state. In the secondary operational state, the first inline-bypass switch appliance 10*a* fails to forward packets from the nodes 22, 23 to the inline tools 50*a*, 50*b*, and the second inline-bypass switch appliance 10*b* is configured to forward packets from the nodes 22, 23 to the inline tools 50*a*, 50*b*. In the secondary operational state, the first communication interface 20*a* receives packets from the node 22. The relays in the first bypass component 60*a* are closed, thereby passing the packets through the first bypass component 60*a* without having the packets processed by the switch 70*a*. The packets are then transmitted out of the second communication interface 24*a* for reception by the first communication interface 20*b* at the second inline-bypass switch appliance 10*b*. At the second inline-bypass switch appliance 10*b*, the relays in the first bypass component 60*c* are opened, thereby passing the packets to the switch 70*b*. The switch 70*b* then forwards the packets to the inline tools 50*b*, 50*a* through the fifth communication interface 30*b* and the seventh communication interface 31*b*. After the inline tools 50*b*, 50*a* process the packets, the packets are returned to the second inline-bypass switch appliance 10*b* at the sixth communication interface 32*b* and the eighth communication interface 33*b*, respectively. The packets are transmitted through the switch 70*b* and the first bypass component 60*c*. The packets are then output at the second communication interface 24*b* at the second inline-bypass switch appliance 10*b* for reception by the node 26.

Also, in the secondary-operational state, the third communication interface 21*a* receives packets from the node 23. The relays in the second bypass component 60*b* are closed, thereby passing the packets through the second bypass component 60*b* without having the packets processed by the switch 70*a*. The packets are then transmitted out of the fourth communication interface 25*a* for reception by the third communication interface 21*b* at the second inline-bypass switch appliance 10*b*. At the second inline-bypass switch appliance 10*b*, the relays in the second bypass component 60*d* are opened, thereby passing the packets to the switch 70*b*. The switch 70*b* then forwards the packets to the inline tools 50*b*, 50*a* through the fifth communication interface 30*b* and the seventh communication interface 31*b*. After the inline tools 50*b*, 50*a* process the packets, the packets are returned to the second inline-bypass switch appliance 10*b* at the sixth communication interface 32*b* and the eighth communication interface 33*b*, respectively. The packets are transmitted through the switch 70*b* and the second bypass component 60*d*. The packets are then output at the fourth communication interface 25*b* at the second inline-bypass switch appliance 10*b* for reception by the node 27.

Accordingly, as shown in the example, even if the first inline-bypass switch appliance 10*a* is down, the second inline-bypass switch appliance 10*b* can still forward packets from the nodes 22, 23 to the inline tools 50*a*, 50*b*, and then pass the packets to the receiving nodes 26, 27.

Although the above example is described with reference to the nodes 22, 23 being network transmitting nodes, in other cases, the nodes 22, 23 may be network receiving nodes. In such cases, the nodes 26, 27 are network transmitting nodes, and the above described packet flow may be reversed in direction.

Figure 14:
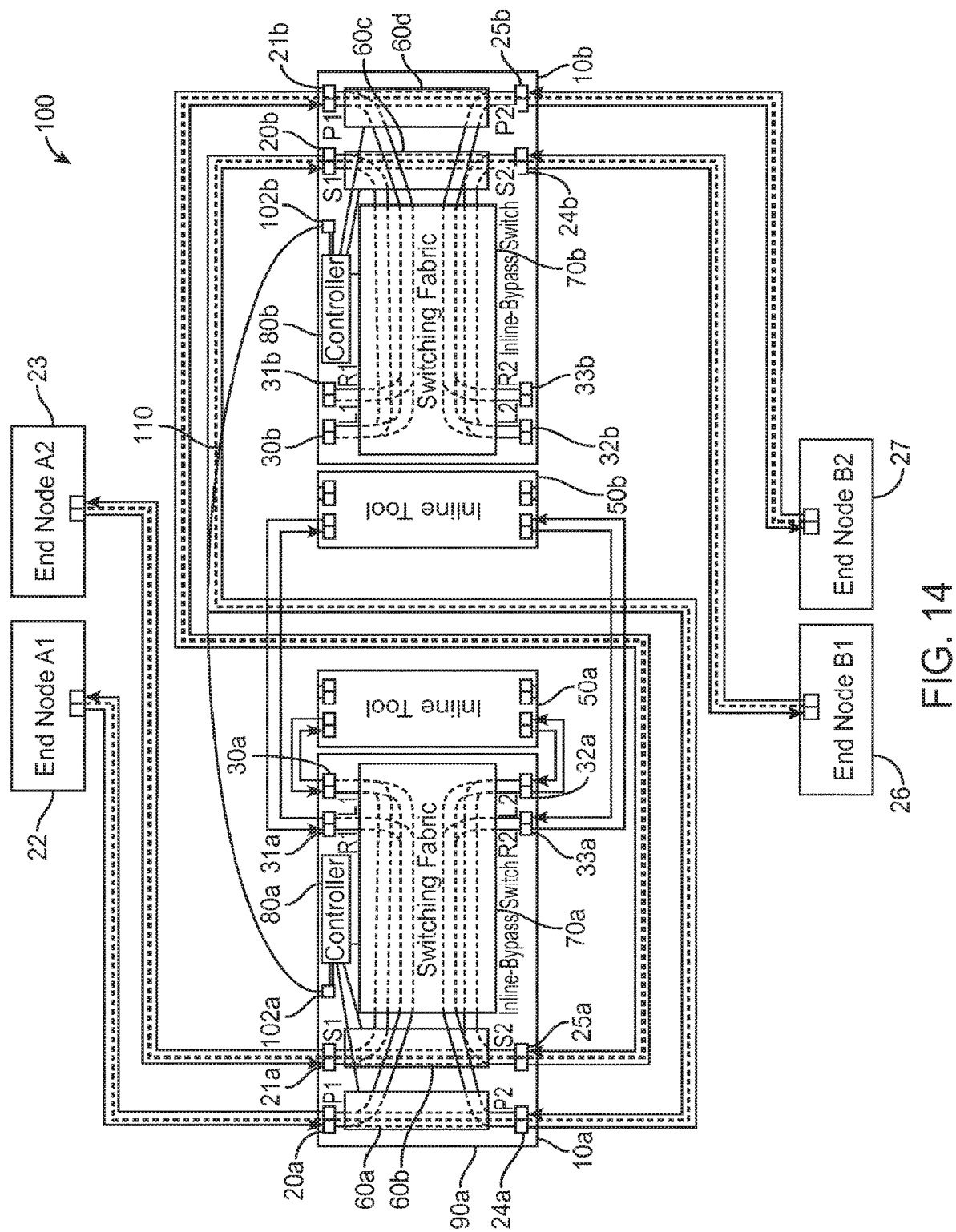
FIG. 14 illustrates the inline-bypass switch system of FIG. 10 when both appliances are in a bypass state.

FIG. 14 shows the inline-bypass switch system 100 in the bypass state. In the bypass state, the first and second inline-bypass switch appliances 10*a*, 10*b* both fail to forward packets from the nodes 22, 23 to the inline tools 50*a*, 50*b*, and packets from the nodes 22, 23 are passed to the nodes 26, 27 without being processed by the inline tools 50*a*, 50*b*. In the bypass state, the first communication interface 20*a* receives packets from the node 22. The relays in the first bypass component 60*a* are closed, thereby passing the packets through the first bypass component 60*a* without having the packets processed by the switch 70*a*. The packets are then transmitted out of the second communication interface 24*a* for reception by the first communication interface 20*b* at the second inline-bypass switch appliance 10*b*. At the second inline-bypass switch appliance 10*b*, the relays in the first bypass component 60*c* are also closed, thereby passing the packets through the first bypass component 60*c* without having the packets processed by the switch 70*b*. The packets are the transmitted out of the second communication interface 24*b* for reception by the node 26.

Also, in the bypass state, the third communication interface 21*a* receives packets from the node 23. The relays in the second bypass component 60*b* are closed, thereby passing the packets through the second bypass component 60*b* without having the packets processed by the switch 70*a*. The packets are then transmitted out of the fourth communication interface 25*a* for reception by the third communication interface 21*b* at the second inline-bypass switch appliance 10*b*. At the second inline-bypass switch appliance 10*b*, the relays in the second bypass component 60*d* are also closed, thereby passing the packets through the second bypass component 60*d* without having the packets processed by the switch 70*b*. The packets are the transmitted out of the fourth communication interface 25*b* for reception by the node 27.

Accordingly, as shown in the above example, even when both the first and second inline-bypass switch appliances 10*a*, 10*b* are down, they can still pass packets between transmitting nodes 22, 23, and receiving nodes 26, 27.

Although the above example is described with reference to the nodes 22, 23 being network transmitting nodes, in other cases, the nodes 22, 23 may be network receiving nodes. In such cases, the nodes 26, 27 are network transmitting nodes, and the above described packet flow may be reversed in direction.

In some embodiments, the controller 80a in the first inline-bypass switch appliance 10a is configured to keep track of the states of the first and second bypass components 60a, 60b, and provide respective state signals that represent the respective states of the bypass components 60a, 60b. The controller 80b in the second inline-bypass switch appliance 10b is configured to control the first and second bypass components 60c, 60d based on the state signals received through the signaling link 110.

Also, in some embodiments, a state signal with a single value may be used to represent both the state of the first bypass component 60a, and the state of the second bypass component 60b. For example, in one implementation, a state signal of "1" may represent the condition when both bypass components 60a, 60b are open, a state signal of "2" may represent the condition when the first bypass component 60a is open and the second bypass component 60b is closed, a state signal of "3" may represent the condition when the first bypass component 60a is closed and the second bypass component 60b is open, and a state signal of "4" may represent the condition when the first bypass component 60a and the second bypass component 60b are closed. Accordingly, the second controller 80b may operate the bypass components 60c, 60d in the second inline-bypass switch appliance 10b based on the single value state signal.

In some embodiments, the first controller 80a may be configured to provide a first state signal having a first value when the first bypass component 60a in the first inline-bypass switch appliance 10a is in a relays-open state. In such cases, the second controller 80b is configured to place the third bypass component 60c in the second inline-bypass switch appliance 10b in a relays-closed state when the first state signal has the first value.

In other cases, the first state signal may have a second value that is different from the first value when the first bypass component 60a in the first inline-bypass switch appliance 10a is in a relays-closed state. In such cases, the second controller 80b is configured to place the third bypass component 60c in the second inline-bypass switch appliance 10b in a relays-open state when the first state signal has the second value and when a packet forwarding path through the second switch 70b has been established.

Similarly, in some embodiments, the first controller 80a may be configured to provide a second state signal having a first value when the second bypass component 60b in the first inline-bypass switch appliance 10a is in a relays-open state. In such cases, the second controller 80b is configured to place the fourth bypass component 60d in the second inline-bypass switch appliance 10b in a relays-closed state when the second state signal has the first value.

In other cases, the second state signal may have a second value that is different from the first value when the second bypass component 60b in the first inline-bypass switch appliance 10a is in a relays-closed state. In such cases, the second controller 80b is configured to place the fourth bypass component 60d in the second inline-bypass switch appliance 10b in a relays-open state when the second state signal has the second value and when a packet forwarding path through the second switch 70b has been established.

Also, in some embodiments, the first controller 80a is configured to close the first bypass component 60a when a packet forwarding path through the first switch 70a has not been established, the first controller 80a is configured to open the first bypass component 60a when the packet forwarding path through the first switch 70a has been established, the second controller 80b is configured to open the third bypass component 60c when a packet forwarding path through the second switch 70b has been established and when the first bypass component 60a is closed, and the second controller 80b is configured to open the third bypass component 60c when the packet forwarding path through the second switch 70b has not been established.

Similarly, in some embodiments, the first controller 80a is configured to close the second bypass component 60b when a packet forwarding path through the first switch 70a has not been established, the first controller 80a is configured to open the second bypass component 60b when the packet forwarding path through the first switch 70a has been established, the second controller 80b is configured to open the fourth bypass component 60d when a packet forwarding path through the second switch 70b has been established and when the second bypass component 60b is closed, and the second controller 80b is configured to open the fourth bypass component 60d when the packet forwarding path through the second switch 70b has not been established.

Also, in some embodiments, the bypass components 60a-60d are naturally in a relays-closed state when there is no power in the first and second inline-bypass switch appliances 10a, 10b.

It should be noted that the above examples have been described with reference to the inline-bypass switch appliance(s) being in communication with inline tool(s). In other embodiments, instead of inline tool(s), the switch appliance(s) described herein may be communicatively coupled to one or more non-inline tools.

Also, in the above examples, the state signal being provided by the controller 70 and transmitted via the signaling link 110 has been described as being in a "down" state or "up" state. In other embodiments, the state signal may have other values. For example, in other embodiments, the state signal may have a first state value (e.g., "1") when the first inline-bypass switch appliance 10a is down (e.g., in which case, the relays in the first bypass component 60a are closed), and a second state value (e.g., "0") that is different from the first state value when the first inline-bypass switch appliance 10a is up (e.g., in which case, the relays in the first bypass component 60a are open).

It should be noted that the arrangements of the inline tools are not limited to the examples described above, and that there are many possible arrangements of sets of inline tools attached to the inline-bypass switch appliances. For example, while sets of one or more inline tools may be dedicated to the first inline-bypass switch appliance 10a and to the second inline-bypass switch appliance 10b, respectively (like that described with reference to FIG. 4), in other embodiments, one or more inline tools may be shared between the first and second inline-bypass switch appliances 10a, 10b. As another example, while sets of one or more inline tools may be shared between the first and second inline-bypass switch appliances 10a, 10b (like that described with reference to FIG. 10), in other embodiments, one or more inline tools may be shared between the first and second inline-bypass switch appliances 10a, 10b. The redundant arrangement of inline-bypass switch appliances described herein applies to any configuration of inline tools because the solution deals with deciding whether the traffic on a particular appliance is guided through the inline tools attached to the appliance or bypassed.

Also, in some embodiments, the set of one or more inline tools associated with the first inline-bypass switch appliance 10a may have the same configuration (e.g., perform one or more functions that are the same) as the set of one or more inline tools associated with the second inline-bypass switch appliance 10b. In other embodiments, the set of one or more inline tools associated with the first inline-bypass switch appliance 10a may have a different configuration (e.g., perform one or more functions that are the different) as the set of one or more inline tools associated with the second inline-bypass switch appliance 10b.

It should be noted that when a "packet" is described in this application, it should be understood that it may refer to the original packet that is transmitted from a node, or a copy of it. Also, a "packet" may refer to any part of a packet. For example, a "packet" may be a header of a packet, a payload of a packet, or both.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

We claim:

1. A method comprising:
    receiving, at a network appliance, a plurality of packets and a state signal from another network node that is external to the network appliance and that is coupled to a source node, the state signal being indicative of a state of the other network node;
    forwarding the plurality of packets by the network appliance based on the state signal, wherein the forwarding includes:
        in response to the state signal being indicative of a first state, forwarding a first packet within the first network switch appliance to a communication component in the network appliance without sending the first packet to an inline tool that is external to the network appliance, the communication component being configured to transmit the packets onto a network connection for communication to a destination node, and
        in response to the state signal being indicative of a second state, forwarding a second packet by the network appliance to the inline tool and subsequently receiving the second packet at the communication component of the network switch appliance from the inline tool; and
    transmitting the plurality of packets, including the first packet and the second packet, by the communication component of the network appliance, onto the network connection for communication to the destination node.

2. The method of claim 1, wherein the second state is a relay-closed state and is different from the first state.

3. The method of claim 1, wherein the state signal is capable of indicating a third state.

4. The method of claim 3, further comprising, if the state signal is in the third state, forwarding a third packet to a second inline tool and subsequently receiving the third packet by the communication component in the network appliance from the second inline tool.

5. The method of claim 4, further comprising determining the third state based on an IP source address of the third packet or an IP destination address of the third packet.

6. An apparatus comprising:
    a first communication port through which to receive a packet from a network appliance;
    a second communication port through which to forward the packet from the apparatus to a destination node;
    a third communication port through which to forward the packet from the apparatus to an inline tool that is external to the apparatus and the network appliance;
    a fourth communication port through which to receive the packet from the inline tool after the packet has been forwarded from the appliance to the inline tool; and
    a state signal input separate from the first, second, third and fourth communication ports, to receive a state signal indicative of a state of a network appliance that is external to the apparatus and that is coupled to the source node; and
    a controller configured to control the apparatus based on the state of the state signal such that, during operation of the apparatus, if the state signal is indicative of a first state, the packet is forwarded from the first communication port to the second communication port via the third communication port, the inline tool and the third communication port for communication to the destination node, but if the state signal is indicative of a second state, the packet is forwarded from the first communication port to the second communication port for communication to the destination node without routing the packet through the inline tool.

7. The apparatus of claim 6, wherein the state signal is set by a first controller of the network appliance.

8. The apparatus of claim 6, wherein the state signal is indicative of whether the packet was processed by a first inline tool associated with the network appliance.

9. The apparatus of claim 6, wherein at least one defined state of the state signal is indicative of the network appliance being turned off.

10. An apparatus comprising:
    a first communication component configured to receive a packet from a source node;
    a second communication component configured to forward the packet to a network appliance that is remote from the apparatus on a selective basis depending on a state of the apparatus;
    a controller configured to transmit a state signal indicative of the state of the apparatus from the apparatus to network appliance, the state signal being capable of indicating a first state according to which the packets, after receipt by the network appliance from the apparatus, are to be provided by the network appliance to an inline tool that is coupled locally to the network appliance and that is separate from the apparatus, for processing by the inline tool, the state signal further being capable of indicating a second state according to which the packets, after receipt by the network appliance from the apparatus, are to be passed through the network appliance and not processed by the inline tool; and
    a state signal output configured to transmit the state signal from the apparatus to the network appliance.

11. The apparatus of claim 10, wherein the second state indicates that the apparatus has lost power.

12. The apparatus of claim 10, wherein when the state signal is further capable of being in a third state in which the packets are not to be processed by said inline tool nor by an additional inline tool that is coupled locally to the apparatus.

13. The apparatus of claim 12, wherein the third state is determined based on an IP source address of the packets or an IP destination address of the packets.

14. A non-transitory storage medium having instructions stored therein, execution of which in a network appliance causes the network appliance to perform operations comprising:

inputting a plurality of packets and a state signal from another network node that is external to the network appliance and that is coupled to a source node, the state signal being indicative of a state of the other network node;

forwarding the plurality of packets based on the state signal, wherein the forwarding includes:

in response to the state signal being indicative of a first state, forwarding a first packet within the first network switch appliance to a communication component in the network appliance without sending the first packet to an inline tool that is external to the network appliance, the communication component being configured to transmit the packets onto a network connection for communication to a destination node, and in response to the state signal being indicative of a second state, forwarding a second packet by the network appliance to the inline tool and subsequently receiving the second packet at the communication component of the network switch appliance from the inline tool; and transmitting the plurality of packets, including the first packet and the second packet, by the communication component of the network appliance, onto the network connection for communication to the destination node.

15. The non-transitory storage medium of claim 14, wherein the second state is a relay-closed state and is different from the first state.

16. The non-transitory storage medium of claim 14, wherein the state signal is capable of indicating a third state.

17. The non-transitory storage medium of claim 16, said operations further comprising, if the state signal is in the third state, forwarding a third packet to a second inline tool and subsequently receiving the third packet by the communication component in the network appliance from the second inline tool.

18. The non-transitory storage medium of claim 17, said operations further comprising determining the third state based on an IP source address of the third packet or an IP destination address of the third packet.

* * * * *